(12) United States Patent
Gabato et al.

(10) Patent No.: US 11,321,037 B2
(45) Date of Patent: May 3, 2022

(54) LASER PRINTHEAD RASTER PATH CONFIGURATION FOR MODIFYING A REWRITEABLE LABEL

(71) Applicant: ZEBRA TECHNOLOGIES CORPORATION, Lincolnshire, IL (US)

(72) Inventors: Manuel P. Gabato, Elmhurst, IL (US); John J. Bozeki, Elgin, IL (US); Thomas Judd, Barrington, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 3 days.

(21) Appl. No.: 16/855,516

(22) Filed: Apr. 22, 2020

(65) Prior Publication Data

US 2021/0334056 A1  Oct. 28, 2021

(51) Int. Cl.
*G06F 3/12* (2006.01)
*B41J 2/44* (2006.01)
*B41J 2/475* (2006.01)
*B41J 3/407* (2006.01)
*B41M 7/00* (2006.01)
*B41J 29/38* (2006.01)
*B41M 5/26* (2006.01)

(52) U.S. Cl.
CPC .......... *G06F 3/1297* (2013.01); *B41J 2/442* (2013.01); *B41J 2/475* (2013.01); *B41J 2/4753* (2013.01); *B41J 3/4075* (2013.01); *B41J 29/38* (2013.01); *B41M 5/26* (2013.01); *B41M 7/009* (2013.01); *B41M 7/0009* (2013.01); *G06F 3/1203* (2013.01); *G06F 3/1293* (2013.01); *B41J 2002/4756* (2013.01)

(58) Field of Classification Search
CPC ....... G06F 3/1297; B41J 2/442; B41J 2/4753; B41J 2002/4756; B41J 3/4075; B41M 5/26; B41M 7/0009; B41M 7/009
See application file for complete search history.

(56) References Cited

U.S. PATENT DOCUMENTS

2007/0268356 A1* 11/2007 Murakami ............... B41J 2/471
 347/233
2018/0339524 A1* 11/2018 Sawamura ............... B41J 2/447

* cited by examiner

*Primary Examiner* — Matthew Luu
*Assistant Examiner* — Kendrick X Liu

(57) ABSTRACT

A label modification unit may receive a label modification input associated with an image. The label modification unit may process, using an image filtering, the label modification input to convert the image to a bitmap for raster printing the image via a laser printhead. The label modification unit may determine, based on the bitmap, an array of power factors for a light beam that is configured to be emitted by a laser of the laser printhead and raster print the image. The label modification unit may control the laser of the laser printhead in association with raster printing the image on a rewriteable label according to the array of power factors.

18 Claims, 13 Drawing Sheets

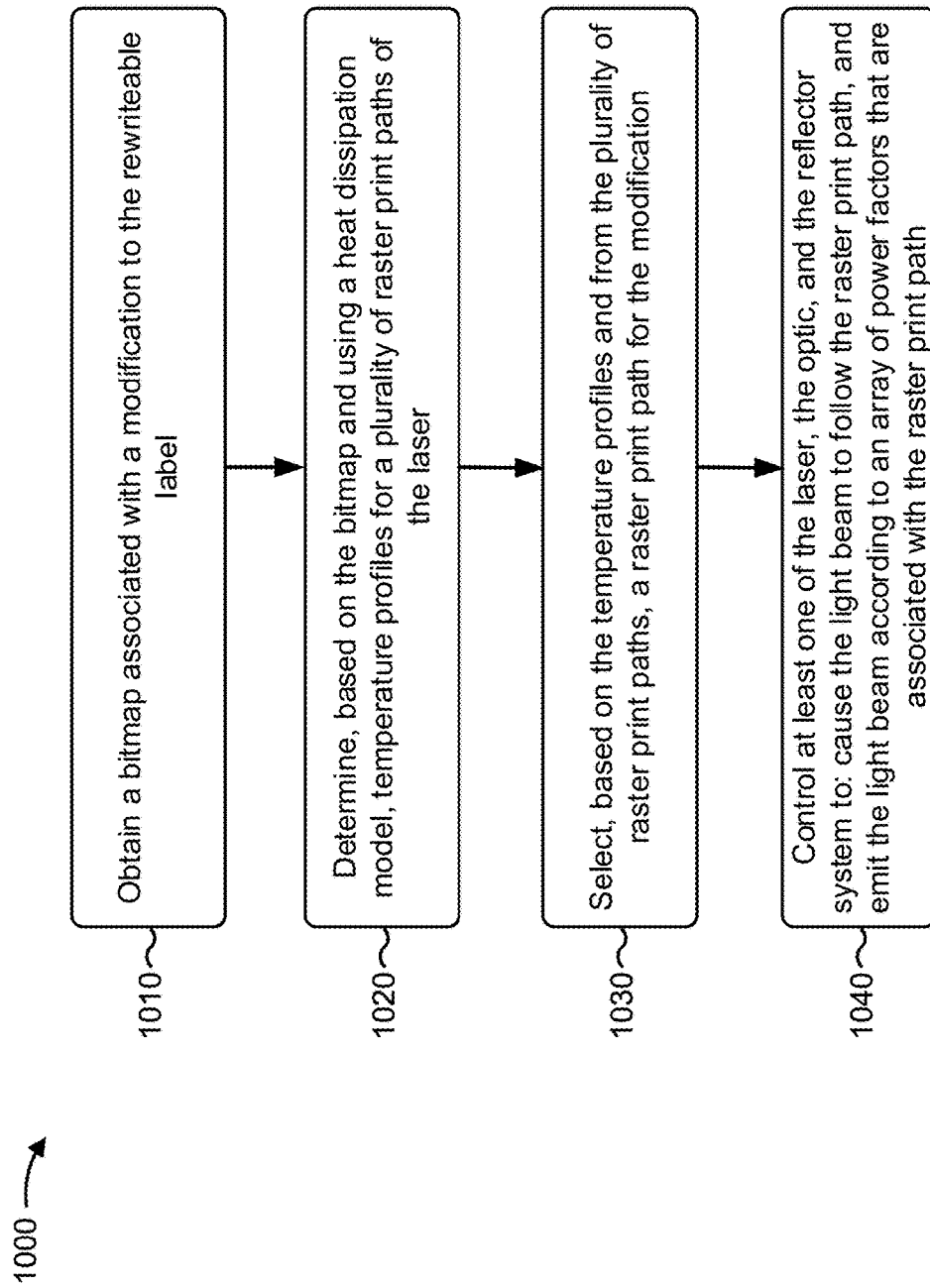

LASER PRINTHEAD RASTER PATH CONFIGURATION FOR MODIFYING A REWRITEABLE LABEL

BACKGROUND

Laser printing involves the production of text and graphics by passing a light beam over a material. Laser attributes may be varied to write or erase content. A laser printhead can be configured to either write or erase content from a rewriteable label based on photothermal properties of the rewriteable label. For example, the laser printhead may be preconfigured to emit the light beam at one power level or with one spot size to write content to the rewriteable label, or the laser printhead may be preconfigured to emit the light beam at another power level or with another spot size to erase content from the rewriteable label.

During raster printing, the raster path of the laser printhead can affect heat dissipation of pixels due to the laser printhead writing or erasing content adjacent a pixel that was recently written or erased. Accordingly, there is a need to consider the heat dissipation of pixels of a rewriteable label when the laser printhead is writing and/or erasing content along a raster path and/or a need to determine a raster path to prevent heat dissipation of a portion of a rewriteable label being affected by content of another pixel being written or erased.

SUMMARY

According to some implementations, a method may include receiving a label modification input associated with an image; processing, using an image filtering, the label modification input to convert the image to a bitmap for raster printing the image via a laser printhead; determining, based on the bitmap, an array of power factors for a light beam that is configured to be emitted by a laser of the laser printhead and raster print the image; and controlling the laser of the laser printhead in association with raster printing the image on a rewriteable label according to the array of power factors.

According to some implementations, a device may include a memory and a processor. In some implementations, the processor is communicatively coupled to the memory. The processor may be configured to: receive an image; convert the image to a bitmap for raster printing the image via a laser printhead; determine, based on the bitmap, an array of power factors for a light beam that is configured to be emitted by a laser of the laser printhead; and cause the laser printhead to emit the light beam to raster print the image on a rewriteable label according to the array of power factors.

According to some implementations, a label modification unit may include a laser configured to emit a light beam to modify a rewriteable label; a reflector system to direct the light beam along a raster print path; and a controller configured to: receive a label modification input that includes an image; process the label modification input to determine a bitmap for raster printing the image via the light beam; determine, based on the bitmap, an array of power factors for the light beam that are configured to modify the rewriteable label with the image; and control, based on the array of power factors, the laser and the reflector system to raster print the image on the rewriteable label.

According to some implementations, a method may include receiving a label modification input associated with an image; determining, based on the image, a bitmap for a light beam that is configured to be emitted by a laser of a laser printhead to print the image; determining, based on the bitmap, a raster print path for the laser printhead to raster print the image; and controlling the laser printhead to raster print the image on a rewriteable label according to the raster print path and the bitmap.

According to some implementations, a device may include a memory and a processor. In some implementations, the processor is communicatively coupled to the memory. The processor may be configured to: receive a bitmap associated with modifying a rewriteable label; determine, based on the bitmap, an array of power factors for a light beam that is configured to be emitted by a laser of a laser printhead to modify the rewriteable label; determine, based on a heat dissipation model and the array of power factors, a raster print path for the light beam; and cause the laser printhead to emit the light beam to raster print an image, associated with the bitmap, on the rewriteable label according to the raster print path and the array of power factors.

According to some implementations, a label modification unit may include a laser configured to emit a light beam to modify a rewriteable label; an optic configured to control a spot size of the light beam based on a position of the optic relative to the laser; a reflector system configured to direct the light beam during raster printing; and a controller that is configured to: obtain a bitmap associated with a modification to the rewriteable label; determine, based on the bitmap and using a heat dissipation model, temperature profiles for a plurality of raster print paths of the laser; select, based on the temperature profiles and from the plurality of raster print paths, a raster print path for the modification; and control at least one of the laser, the optic, and the reflector system to: cause the light beam to follow the raster print path, and emit the light beam according to an array of power factors that are associated with the raster print path.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts that include the claimed invention, and explain various principles and advantages of those implementations.

FIG. 10 is a flowchart of another example process for control of a laser printhead for erasing and writing content.

Figure 1A:
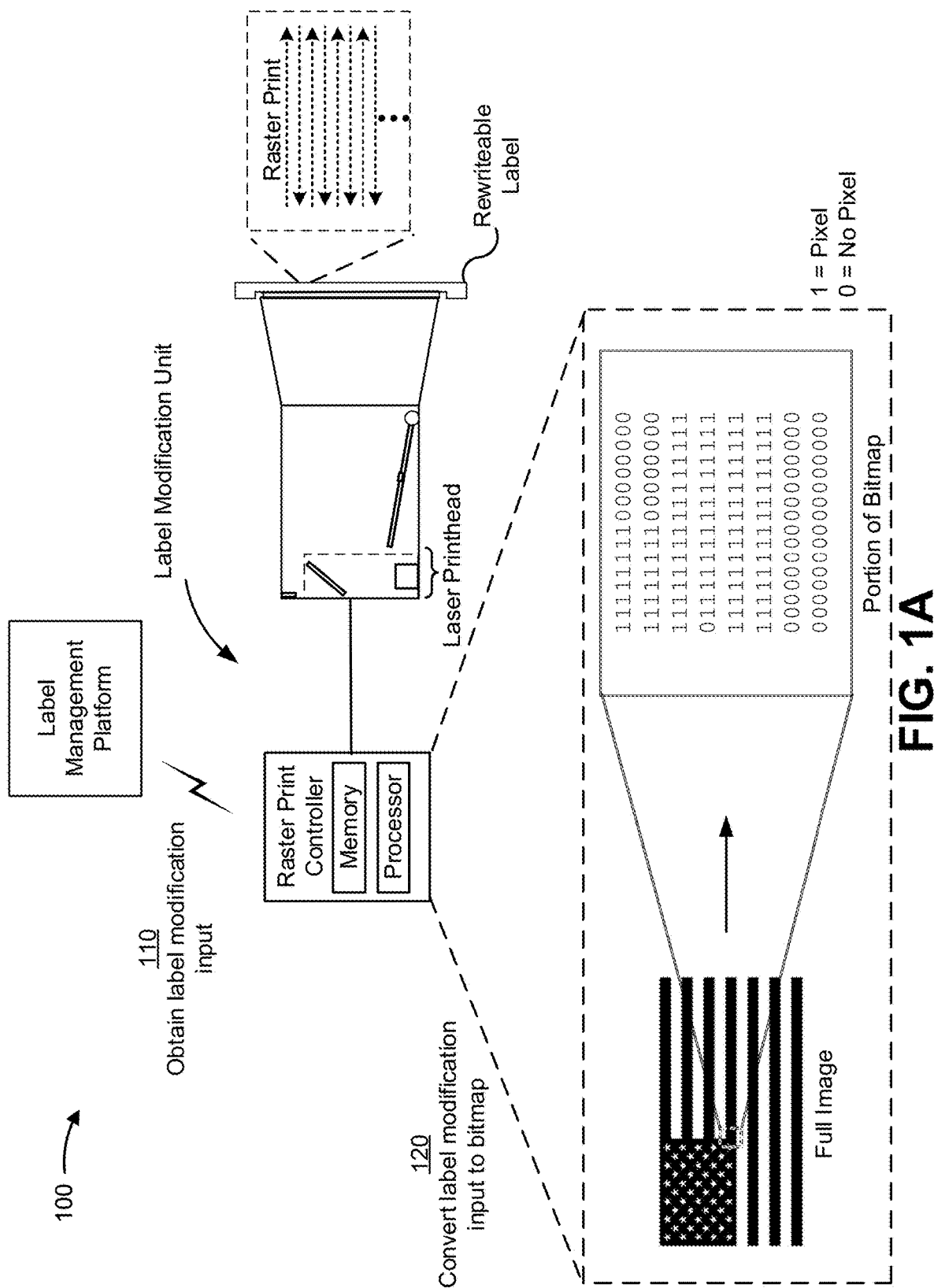
FIGS. 1A-1C are diagrams of one or more example implementations for control of a laser printhead for writing or erasing content.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

In some instances, a label modification unit may be configured with a set of laser printheads to permit the label modification unit to modify a label (e.g., a rewriteable label). In such cases, the label modification unit may include a plurality of laser printheads that are individually configured to write or erase the content. More specifically, one of the plurality of laser printheads may be configured to write content and another one of the plurality of laser printheads may be configured to erase content. In some cases, multiple laser printheads of the plurality of laser printheads can be included to print content to different sizes of areas of the label. However, in some cases, the plurality of laser printheads may be utilized within a mobile and/or navigable device (e.g., an autonomously controlled device) that is to modify one or more rewriteable labels within an environment. Including the plurality of laser printheads on such a device can add considerable weight and/or complexity to the device.

Some implementations described herein provide a label modification unit that includes a laser printhead with a laser, a variable optical element, a reflector system, and a controller that enables the laser printhead to both write content to or erase content from a rewriteable label. In this way, relative to previous label modification units, the label modification unit, described herein, can reduce hardware resources (e.g., by reducing hardware associated with a plurality of laser printheads) and/or improve efficiencies relative to previous label modification units (e.g., by reducing a weight and/or size of a device that is to utilize the laser printhead).

Figure 1B:
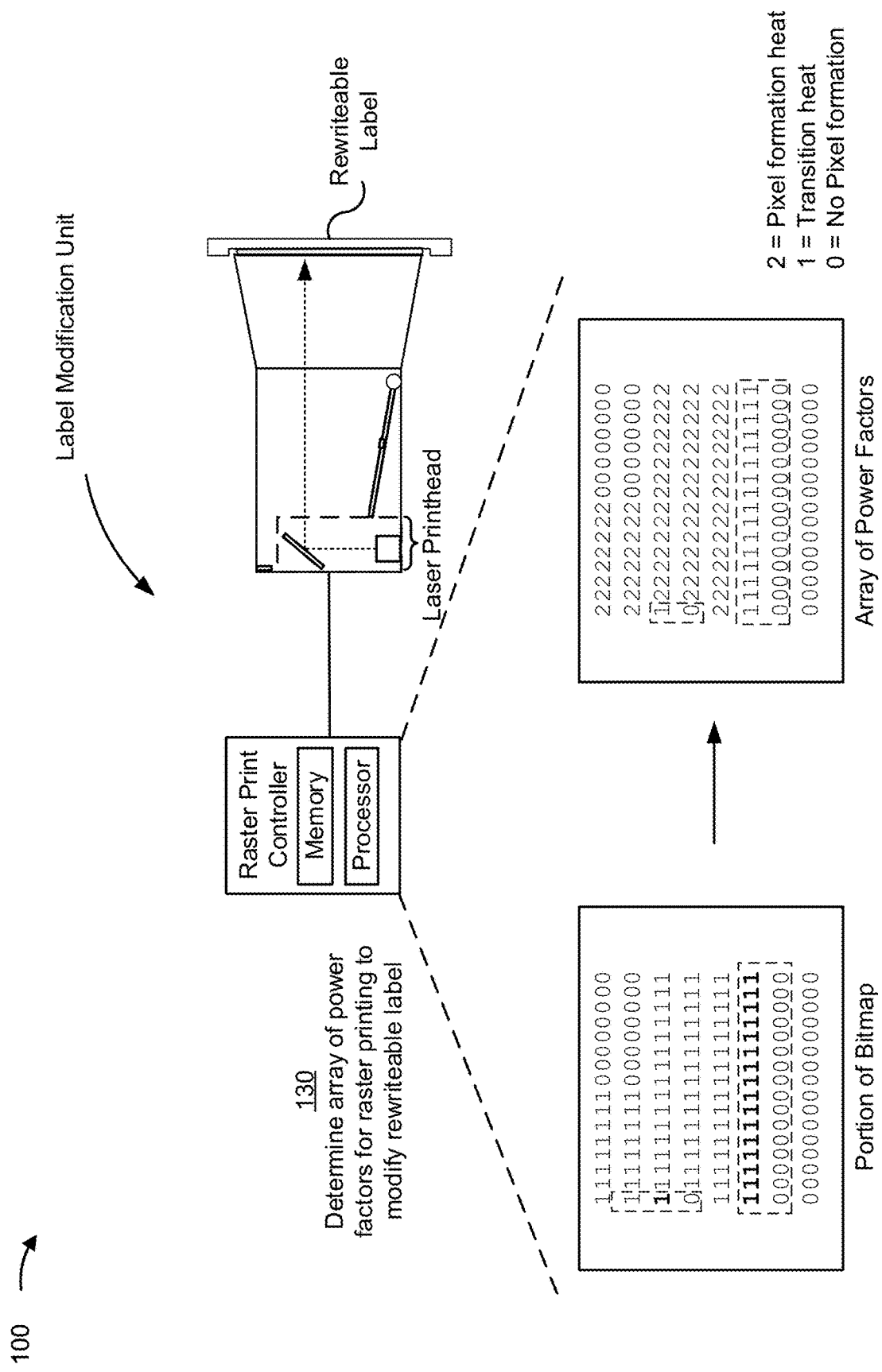
Figure 1C:
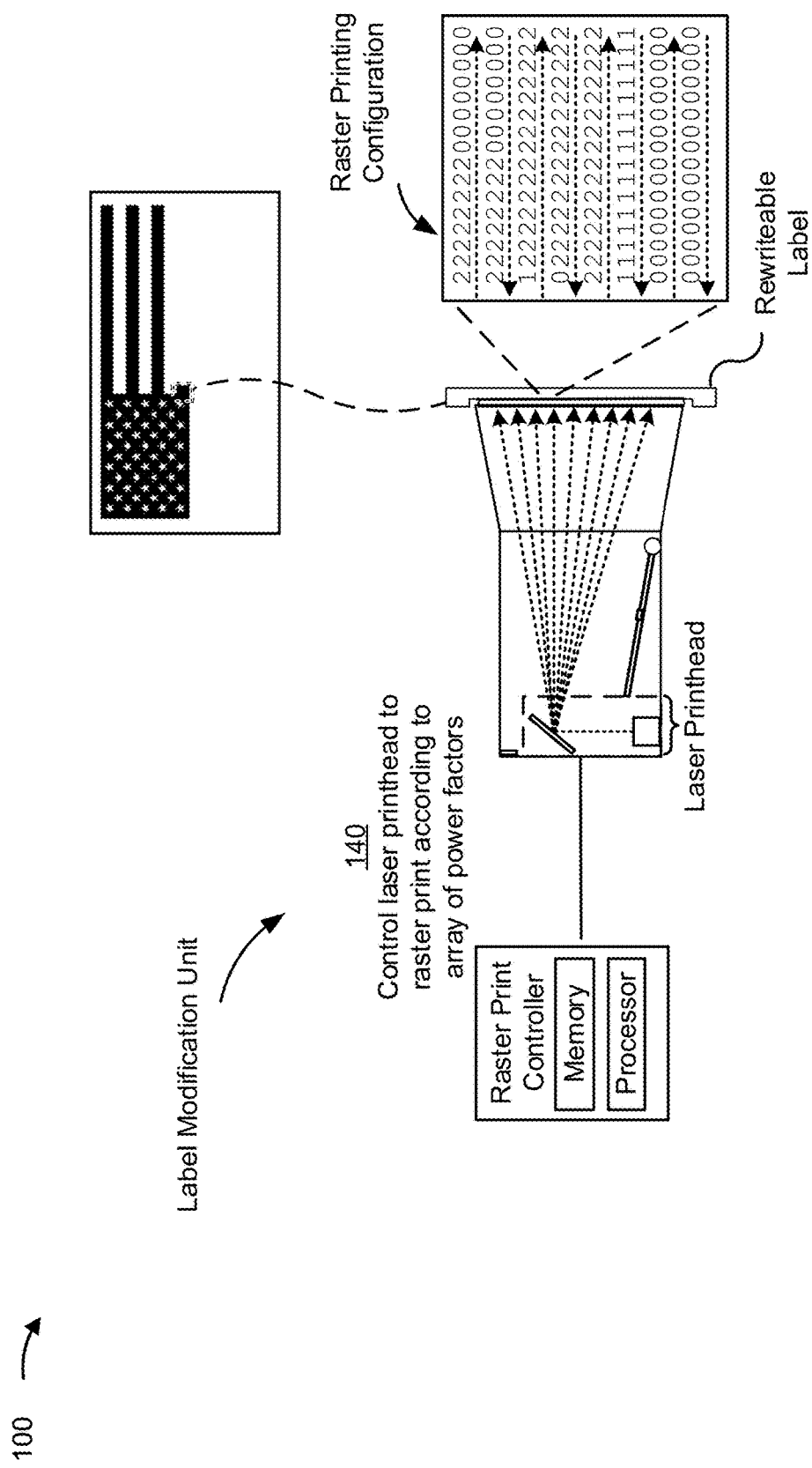

FIGS. 1A-1C are diagrams of one or more example implementations 100 described herein. Example implementation(s) 100 relates to controlling a laser printhead for writing or erasing content. Example implementation(s) 100 includes a label management platform, a label modification unit, and a rewriteable label positioned within an environment. The rewriteable label may be one of a plurality of labels in the environment. The environment may be associated with an entity (e.g., an individual or organization) that stores, manages, rents, and/or sells goods or products that are to be identified by the rewriteable labels (e.g., according to information received from the label management platform).

As shown in FIG. 1A, the label management platform may include one or more devices that manage label information associated with the labels in the environment. The information may include label information, such as location information that identifies a location of a label, information associated with content of a label, information associated with modifying a label, and/or the like. In some implementations, label management platform may receive information from and/or transmit information to the label modification unit.

The label modification unit may include a raster print controller and a laser printhead. As described herein, the label modification unit may be used to modify (e.g., autonomously and/or semi-autonomously) labels (e.g., the rewriteable label) in a setting with a plurality of rewriteable labels, such as in a retail store, a warehouse, and/or the like. For example, the raster print controller, based on information and/or instructions from the label management platform, may control the laser printhead to print in accordance with a printing pattern. For example, the raster print controller may control the laser printhead to raster print. Raster printing (or rastering), as used herein, may refer to the process of printing with pixels in a pixel-by-pixel (e.g., on a material), line-by-line, back and forth manner from top to bottom. As shown in an example raster print illustrated in FIG. 1A, the raster print controller may control the laser printhead to print pixels, on a first line, from left to right. After the laser print head prints the pixels on the first line, the raster print controller may control the laser printhead to print pixels, on a second line (located below the first line), from right to left. After the laser print head prints the pixels on the second line, the raster print controller may control the laser printhead to print pixels, on a third line (located below the second line), from left to right, and so on. Alternatively, the raster print controller may control the laser printhead to print pixels, on each line, from left to right or from right to left.

While certain actions and/or operations are described in connection with example implementation(s) 100 as being performed by the raster print controller, such actions and/or operations may be similarly performed and/or caused to be performed by the label management platform. The raster print controller may include one or more memories and/or processors configured to receive, generate, process, and/or transmit information (e.g., controls, instructions, and/or the like) associated with modification of the rewriteable label, as described herein. For example, as described herein, the raster print controller may be used to operate components on the label modification unit, such as, for example, one or more components of the laser printhead.

The rewriteable label includes a material that is able to support print and be used to display content. For example, the rewriteable label may include a photothermal material that reacts to different temperatures, such that a light beam (e.g., of a laser printhead) may be used to monochromatically write and/or erase content to the rewriteable label. Additionally, or alternatively, the rewriteable label may be associated with a support or mount structure that is comprised of one or more materials that may affect the photothermal properties of the rewriteable label and/or dissipation of heat from the light beam based on characteristics of the emitted light beam (and/or characteristics of the laser printhead that emits the light beam).

As shown in FIG. 1A, and by reference number 110, the label modification unit may obtain a label modification input. In some implementations, the label modification input may be obtained from the label management platform (e.g., via a wireless transmission, a wired transmission, or a combination of wired and wireless transmissions). Alternatively, the label modification unit may be preprogrammed with the label modification input. For example, the label modification input may be stored in a memory of the label modification unit (e.g., a memory of the raster print controller). Alternatively, the label modification input may be received from a user device (e.g., a mobile phone, a laptop computer, a tablet computer, a desktop computer, a handheld computer, and/or the like) of a user. The label modification unit may use the label modification input to perform label modification.

The label modification input may include information used by the label modification unit to determine a label modification associated with modifying the rewriteable label (e.g., information that indicates whether to modify the rewriteable label, information associated with how to modify the rewriteable label, and/or the like). For example, the label modification input may include information regarding an area of the rewriteable label to be modified, content that is currently present on the rewriteable label, content to be written onto the rewriteable label, and/or the like. In some implementations, the label modification input may include information that indicates areas of the rewriteable label to erase content and/or areas of the rewriteable label to write new content. As an example, the label modification input may include an image to be printed on the rewriteable label, as shown in FIG. 1A. In this regard, the label modification input may include an image file of the image. The image may be depicted by one or more pixels.

As shown in FIG. 1A, and by reference number 120, the raster printer controller may convert the label modification input to a bitmap. As example, the label modification input may include an image to be printed on the rewriteable label, as shown in FIG. 1A. In this regard, the bitmap may be generated based on the image. Accordingly, dimensions of the bitmap may be the same as dimensions of a pixel array of the image. The bitmap may be used for controlling the laser printhead to raster print the image on the rewriteable label. As shown, the bitmap may be a representation of the image that uses pixel values for pixels of the image.

When converting the label modification input, the raster print controller may analyze the label modification input to identify information regarding content to be written onto the rewriteable label, content to be erased from the rewriteable label, and/or content to remain unmodified on the rewriteable label. For example, the raster print controller may analyze pixels of the image and assign bit values based on analyzing the image. For instance, the raster print controller (e.g., based on an image filtering technique and/or using an image filter) may assign a bit value for the content to be written onto the rewriteable label (e.g., a pixel, of the image, to be written on to the rewriteable label). The raster print controller may determine and assign another bit value for the content to be erased from the rewriteable label (e.g., a pixel, of the image, representing a blank space) or content to remain unmodified on the rewriteable label.

The raster print controller may generate the bitmap including the assigned bits. For example, each bit in the bitmap that is set to one (1) may represent a pixel (e.g., a content element to be written onto the rewriteable label), and each bit in the bitmap that is set to zero (0) represent no pixel (e.g., a content element to be removed from the rewriteable label or a content element to remain unmodified on the rewriteable label). In this regard, the bitmap may be a binary bitmap. For example, the bitmap may be a binary text file (e.g., a text file with bits having a value of one (1) or zero (0)). In such a case, the ones may correspond to black content and the zeros may correspond to white content (or no content). A portion of the bitmap that may be generated, by the raster print controller and using the image, is illustrated in FIG. 1A. According to some implementations, the bitmap may include pixel values that are based on ranges of a particular color scheme (e.g., grayscale, color, and/or the like). For example, a grayscale image may be converted to a bitmap of pixel values that range from 0 to 4, where zero is white (or no content) content, one (1) is a lighter gray, two (2) is an intermediate gray, three (3) is darker gray, and four (4) is black.

As shown in FIG. 1B, and by reference number 130, the raster print controller may determine an array of power factors for raster printing to modify the rewriteable label. The array of power factors may be determined based on the bitmap. For example, the raster print controller may analyze the bits, of the bitmap, to determine the array of power factors. The bitmap may correspond to an array of pixels (or a pixel array) of the image when the image is depicted on the rewriteable label. In this regard, as shown in FIG. 1B, dimensions (e.g., a quantity of columns and rows or lines) of the array of power factors may be the same as dimensions of the array of pixels of the image. The raster print controller may use the array of power factors to control a power level of the light beam emitted by the laser printhead of the laser modification unit. In this regard, the array of power factors may include an array of power levels (e.g., or intensities) for the laser, an array of spot sizes for the light beam (e.g., a dimension or diameter of the light beam), an array of dwell times (e.g., a duration that the light beam is to be focused on or over the pixels of the array of pixels), or a combination of the array of power levels, the array of spot sizes, and/or the array of dwell times.

The raster print controller may determine a power level of the laser (as a power factor) for each bit of the bitmap (e.g., based on a bit value of each bit) and may generate the array of power levels (and/or other power factors) based on determining the power levels of the light beam for all bits of the bitmap. For example, as shown in FIG. 1B, if a bit value of a bit is zero (0), then the raster print controller may assign a power level of zero (0) for that bit (or assign a value of zero (0) for the power level associated with that bit). The power level of zero may correspond to a power level that includes no pixel (or white content). If the bit value is one (1), then the raster print controller may determine the power level based on bit values of pairs of adjacent bits in the bitmap. For example, the raster print controller may identify, adjacent pairs of bits that are along a raster print path and determine the power level of a first bit relative to whether a second bit, that is adjacent bit to the first bit, is to include content (e.g., is a one (1)) or is not to include content (e.g., relative to whether the second bit is a zero (0)). In such a case, the raster print controller may account for the temperature of a location of the rewriteable label that corresponds to the adjacent bit being relatively cool (the laser is not to write content to or erase content from the location) or relatively warm (the laser is to write to or erase content from the location).

Accordingly, the raster print controller may compare the value of a first bit of the bitmap and the value of a second bit of the bitmap that is adjacent to the first bit. For instance, the first bit may be on a particular line (and on a particular column) and the second bit may be on another line immediately below the particular line (and on that particular column of the bitmap). As shown in FIG. 1B, if the bit value of the first bit is one (1) and the bit value of the second bit is one (1), then the raster print controller may assign a power level of two (2) or higher for the first bit (or assign a value of two (2) or higher for the power level associated with the first bit). As shown in FIG. 1B, if the bit value of the first bit is one (1) and the bit value of the second bit is zero (0), then the raster print controller may assign a power level of one (1) for the first bit (or assign a value of one (1) for the power level associated with the first bit). A power level of one (1) may be assigned to account for heat dissipation associated with a power level of two (2) or higher, as will be explained below. According to some implementations, the power level may be increased to a maximum power level (e.g., two (2) in example implementation 100) to write content for one or more bits immediately following, along a raster path, a location of the rewriteable label that is not going to be written or erased (e.g., to heat the locations of the one or more bits more quickly) and/or to write content for one or more edge bits of the image that are adjacent locations of the rewriteable label that are not to be written with content (e.g., a margin or edge of the rewriteable label).

A power level may be representative of an amount of heat that the light beam is to provide to the rewriteable label at a location of the rewriteable label that corresponds to the bit of the bitmap. As shown in FIG. 1B, for example, a power level of two (2) or higher may correspond to an amount of heat that the light beam is to provide to form (or generate) content on the rewriteable content (e.g., a pixel). A power level of one (1) may correspond to an amount of heat that the light beam is to provide to form (or generate) content on the rewriteable content (e.g., a pixel). The amount of heat (for the power level of one (1)) may be less than the amount of heat (for the power level of two (2)) to account for heat dissipation, as described below. A power level of zero (0) may correspond to an amount of heat that the light beam is to provide to erase content from the rewriteable content (e.g., no pixel). In this regard, the array of power factors may be a non-binary bitmap (e.g., a non-binary text file) that corresponds to the bitmap. The power level of zero (0) may be less than the power level of one (1) and the power level of one (1) may be less than the power level of two (2) or higher. The values of the power levels discussed above are provided merely as examples. Other examples may differ from what is described with regard to the values above.

The power level of one (1) may serve as a transition amount of heat to account for heat dissipation that may occur between an area of the rewriteable label that may be subjected to the power level of zero (0) (which may be associated with not modifying content, or erasing content) and an area of the rewriteable label that may be subjected to the power level two (2) or higher. For example, consider three adjacent bits in a column of the portion of the bitmap shown in FIG. 1B. As shown in FIG. 1B, a first bit (on a first line) has a bit value of one (1), a second bit (on a second line immediately below the first line) has a bit value of one (1), and a third bit (on a third line immediately below the second line) has a bit value of zero (0). In this regard, assigning a power level of two (2) or higher to the first bit and the second bit (based on the bit value of one (1)) and assigning a power level of zero (0) to the third bit may cause heat (or excess heat), from the locations on the rewriteable label subjected to the power level of two (2), to transfer to the location on the rewriteable label that is to be subjected to an amount of heat corresponding to the power level of zero (0). For example, the heat may transfer if the light beam is to be emitted at the power level of zero (0) within a relatively short of period of time after the light beam was emitted at the power level of two (2).

Figure 2:
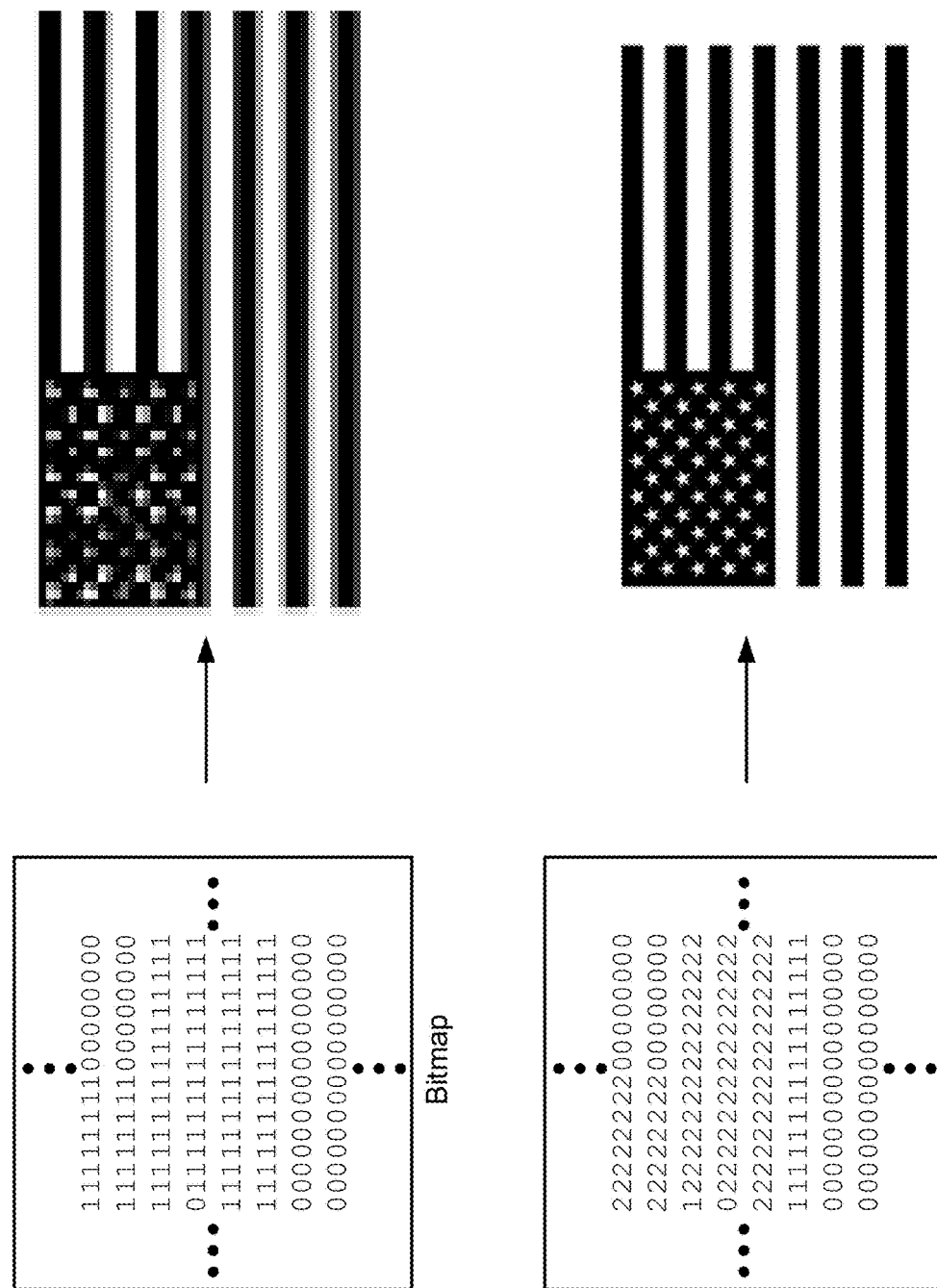
FIG. 2 is a diagram of an example implementation associated with label modification, as described herein.

Due to the transfer of heat, that location on the rewriteable label would be subjected to an amount of heat that exceeds the amount of heat associated with the power level of zero (0). Accordingly, the heat dissipation may cause a degradation in the resolution of the content printed on the rewriteable label, as shown in FIG. 2, for example. More specifically, the heat dissipation between an area, on the rewriteable label, associated with a bit value of two (2) (e.g., pixel) and an area, on the rewriteable label, associated with a bit value of zero (0) (e.g., no pixel) may cause a degradation in resolution of the corresponding content. In this regard, the raster print controller may assign a power level of one (1) based on analyzing bit values of adjacent bits, as explained above, to prevent (or reduce) heat dissipation on the rewriteable label and, therefore, improve the resolution of the content printed on the rewriteable label, as shown in FIG. 2. Referring back to FIG. 1B, the raster print controller may therefore assign a power level of one (1) to the second bit to prevent heat dissipation on the rewriteable label. The power level of one (1) may be used to achieve a constant localized heating in desired areas of the rewriteable label.

As discussed above, a power level may be representative of an amount of heat that the light beam is to provide to the rewriteable label at a location of the rewriteable label that corresponds to the bit of the bitmap (e.g., to write content or to erase content). In this regard, the raster print controller may determine a power level based on a temperature profile for writing content to or erasing content from an area of the rewriteable label. For example, the raster print controller may be configured with one or more temperature profiles to write to the rewriteable label (and/or any other rewriteable label in the environment of the label modification system) or erase content from the rewriteable label. In some implementations, an area of the rewriteable label of example implementation(s) 100 can be written to when the area reaches a relatively high temperature (e.g., greater than 170 degrees Celsius (° C.)) and is cooled at a corresponding write rate, while content from the area can be erased when the area reaches a relatively low temperature (e.g., approximately 150° C. to approximately 170° C.) and is cooled at a corresponding erase rate. In some implementations, cooling an area relatively quickly may cause content to be written (e.g., monochromatically), whereas cooling an area relatively slowly may allow content to be erased from the rewriteable label.

For example, a power level of zero (0) may correspond to temperatures ranging from approximately 150° C. to approximately 170° C. A power level of one (1) may correspond to temperatures ranging from approximately 171° C. to a threshold temperature (e.g., exceeding approximately 171° C.) that prevents heat dissipation. A power level of two (2) or higher may correspond to temperatures exceeding the threshold temperature. Accordingly, the raster print controller may maintain one or more temperature profiles that identify specifications for modifying (e.g., writing content to or erasing content from) a particular rewriteable label. As an example, the raster print controller may determine the one or more temperature profiles based on information regarding a thermal sensitivity of the particular rewriteable label. The information regarding the thermal sensitivity may be obtained from the label management platform, may be preprogrammed in a memory of the raster print controller, may be determined based on information identifying the label, and/or the like. The specifications may include a desired write temperature and/or write cooling rate for writing with a particular spot size and/or to an area having a particular size. Similarly, the temperature profile may include a desired erase temperature and/or erase cooling rate for erasing with a particular spot size and/or from an area having a particular size.

As discussed above, the array of power factors may include an array of spot sizes for the light beam. In this regard, the raster print controller may determine a spot size of the light beam based on a size of an area of the rewriteable label that is to be modified, one or more dimensions (e.g., a length and/or a width) of one or more portions (e.g., lines, characters, shapes, and/or the like) of the content that is to be written to the rewriteable label or erased from the rewriteable label, and/or the like. In such cases, the raster print controller may analyze a quantity of pixels associated with the area and/or the content that is to be modified, and determine the size of the area and/or dimensions of the content based on the quantity of pixels (and/or layout of the pixels). In some implementations, the raster print controller may determine the spot size based on a range of power levels of a light beam that can be emitted the laser (e.g., according to a range of available power being supplied to the laser) and/or the ability of an optical system associated with the laser printhead to vary the spot size of the light beam. The optical system is described below. In some instances, adjusting a focus of a variable optical element of the label modification unit may alter a spot size, a shape, and/or the like of a light beam. For example, the raster print controller may be configured with one or more temperature profiles to write to the rewriteable label (and/or any other rewriteable label in the environment of the label modification system) or erase content from the rewriteable label.

In some examples, the raster print controller may compare the bitmap generated based on the content of the label modification input and a bitmap generated for content already on the rewriteable label and may generate an array of power factors based on a result of the comparison. The bitmap generated for the content already on the rewriteable label may be obtained from a label management platform, a memory of the raster print controller, a user device (as described herein), and/or the like. As an example, the raster print controller may determine differences between the bitmap generated based on the content of the label modification input and the bitmap generated for the content already on the rewriteable label based on a result of the comparison and generate a difference bitmap based on the differences. For instance, if a bit (of the bitmap generated based on the content of the label modification unit) is same as a corresponding bit (of the bitmap generated for the content already on the rewriteable label), then a corresponding bit of the difference bitmap may be a zero (0) to indicate no change. The raster print controller may use the difference bitmap to generate the array of power factors. Using the difference bitmap to generate the array of power factors may conserve printhead resources by concentrating/focusing the modifications to just the changes that need to be made to the content that already exists on the rewriteable label.

As shown in FIG. 1C, and by reference number 140, the raster print controller may control the laser printhead to raster print according to the array of power factors. For example, the raster print controller may analyze the array of power factors and cause the laser to emit, for each bit of the array of power factors, a light beam at a corresponding power level to write content to (e.g., write pixels to) or erase content from (e.g., erase pixels from) the rewriteable label (e.g., to depict an image). As shown in FIG. 1C, the raster print controller may cause the laser printhead to raster print in accordance with a raster print path. For example, the raster print controller may control the light beam to follow, using a reflector system of the laser printhead, a raster print path defined by the array of power factors. For example, the raster print path may be based on a raster printing configuration of the array of power factors. The raster print configuration may correspond to a row and column configuration of the array of power factors. The raster print configuration for printing a portion of the content of the label modification input is illustrated in FIG. 1C.

According to some implementations, a raster print path may be preconfigured for the laser printhead. In such a case, the laser printhead modifies the rewriteable label in a preconfigured pixel-by-pixel order, line-by-line order, and/or the like. Accordingly, the laser printhead may direct the light beam along a raster print path along one or more lines in a particular direction (e.g., a horizontal direction, a vertical direction, a diagonal direction, and/or the like), to or between the one or more lines in a particular order (e.g., left-to-right, right-to-left, alternating left-to-right and right-to-left, top-to-bottom, bottom-to-top, alternating top-to-bottom and bottom-to-top, and/or the like). In some implementations, the raster path can be selected from a plurality of preconfigured raster paths (e.g., based on a configuration or characteristic of the image and/or bitmap). In this way, an order of pixels (corresponding to the bits of the bitmap) can be determined from the raster path and corresponding power factors can be determined for an array of power factors that are specifically configured for modifying the rewriteable label using the selected preconfigured raster path.

As shown in FIG. 1C, based on the raster print path, the raster print controller may cause the laser printhead to emit, for each bit of a first row of the array of power factors, a light beam at a corresponding power level to print pixels from left to right. After the first row, the raster print controller may cause the laser printhead to emit, for each bit of a second row (immediately below the first row) of the array of power factors, a light beam at a corresponding power level from right to left. After the second row, the raster print controller may cause the laser printhead to emit, for each bit of a third row (immediately below the second row) of the array of power factors, a light beam at a corresponding power level from left to right, and so on.

In some implementations, the raster print controller may combine coordinates of the raster print path with corresponding power factors, of the array of power factors, to generate a raster print array. For example, for each content element (e.g., pixel) to be printed, the raster printer controller may determine coordinates of the content (associated with the raster print path), a power level (based on the array of power factors) of the light beam emitted for printing the content, and a focus/spot size (based on the array of power factors) of the light beam emitted for printing the content. For instance, each content element may be represented by raster print array information in the format (X, Y, P, F), where X and Y represent two dimensional (2D) coordinates, P represents the power level of the light beam, and F represents the focus/spot size. The raster print array information may be included in the raster print array.

The raster print controller may control the laser printhead to raster print according to the raster print array. For example, the raster print controller may cause the laser printhead to raster print based on power level and/or based on focus/spot size. For instance, the raster print controller may cause the laser printhead to print or raster print each pixel associated with a first power level (e.g., power level of two (2)), followed by each pixel associated with a first power level (e.g., power level of one (1)), followed each pixel associated with a first power level (e.g., power level of zero (0)), and so on. Similarly, for each pixel associated with a same power level, the raster print controller may cause the laser printhead to print or raster print each pixel associated with a first focus/spot size, followed by each pixel associated with a second focus/spot size, followed by each pixel associated with a third focus/spot size, and so on. Accordingly, the raster print controller may cause the laser printhead to print or raster print the pixels based on an order of power levels, an order of focus/spot sizes, or a combination. Causing the laser printhead to print based on power level and/or based on focus/spot size may preserve resources and reduce an amount of time that would have been used to adjust a power level and/or a spot size of the light beam emitted by the laser printhead on potentially a pixel-by-pixel basis. Additionally, causing the laser printhead to print based on power level may reduce or prevent heat dissipation. The printing sequences discussed above are provided merely as examples. Other examples may differ from what is described with regard to the printing sequences.

The number and arrangement of devices and components shown in FIGS. 1A-1C are provided as one or more examples. In practice, there may be additional devices and/or components, fewer devices and/or components, different devices and/or components, or differently arranged devices and/or components than those shown in FIGS. 1A-1C. Furthermore, two or more devices or components shown in FIGS. 1A-1C may be implemented within a single device or component, or a single device or component shown in FIGS. 1A-1C may be implemented as multiple, distributed devices or components. Additionally, or alternatively, a set of devices or components shown in FIGS. 1A-1C may perform one or more functions described as being performed by another set of devices or components shown in FIGS. 1A-1C.

FIG. 2 is a diagram of an example implementation 200 associated with label modification of a rewriteable label, as described herein. Example implementation 200 illustrates a bitmap converted from content of a label modification input. For example, the content may include an image. The content may be converted to a bitmap in a manner similar to the manner described with respect to FIG. 1A. The bitmap may be analyzed and used by the raster print controller to cause the laser printhead to write the content (in this case, an image) on the rewriteable label. As shown in FIG. 2, the resolution of the image printed on the rewriteable label may be degraded due to the heat dissipation discussed above with respect to FIG. 1B. In this regard, and referring back to FIG. 2, the bitmap does not account for the heat dissipation that may occur on the rewriteable label. Accordingly, the degraded resolution may occur when the raster print controller causes the laser printhead to write content to and/or remove content from the rewriteable label using a bitmap that does not account for the heat dissipation that may occur on the rewriteable label.

Example implementation 200 illustrates an array of power factors. The raster print controller may generate the array of power factors based on the bitmap in a manner similar to the manner described above with respect to FIG. 1B. The array of power factors may be analyzed and used by the raster print controller to cause the laser printhead to write the content on the rewriteable label, in a manner similar to the manner described above with respect to FIGS. 1B and 1C. As shown in FIG. 2, the resolution of the image printed on the rewriteable label may be improved due to the array of power factors taking into account the heat dissipation. In this regard, the array of power factors includes a bit (described above) representing a power level (of the light beam emitted by the laser printhead) that prevents (or reduces) the heat dissipation.

As indicated above, FIG. 2 is provided merely as an example. Other examples may differ from what is described with regard to FIG. 2.

Figure 3:
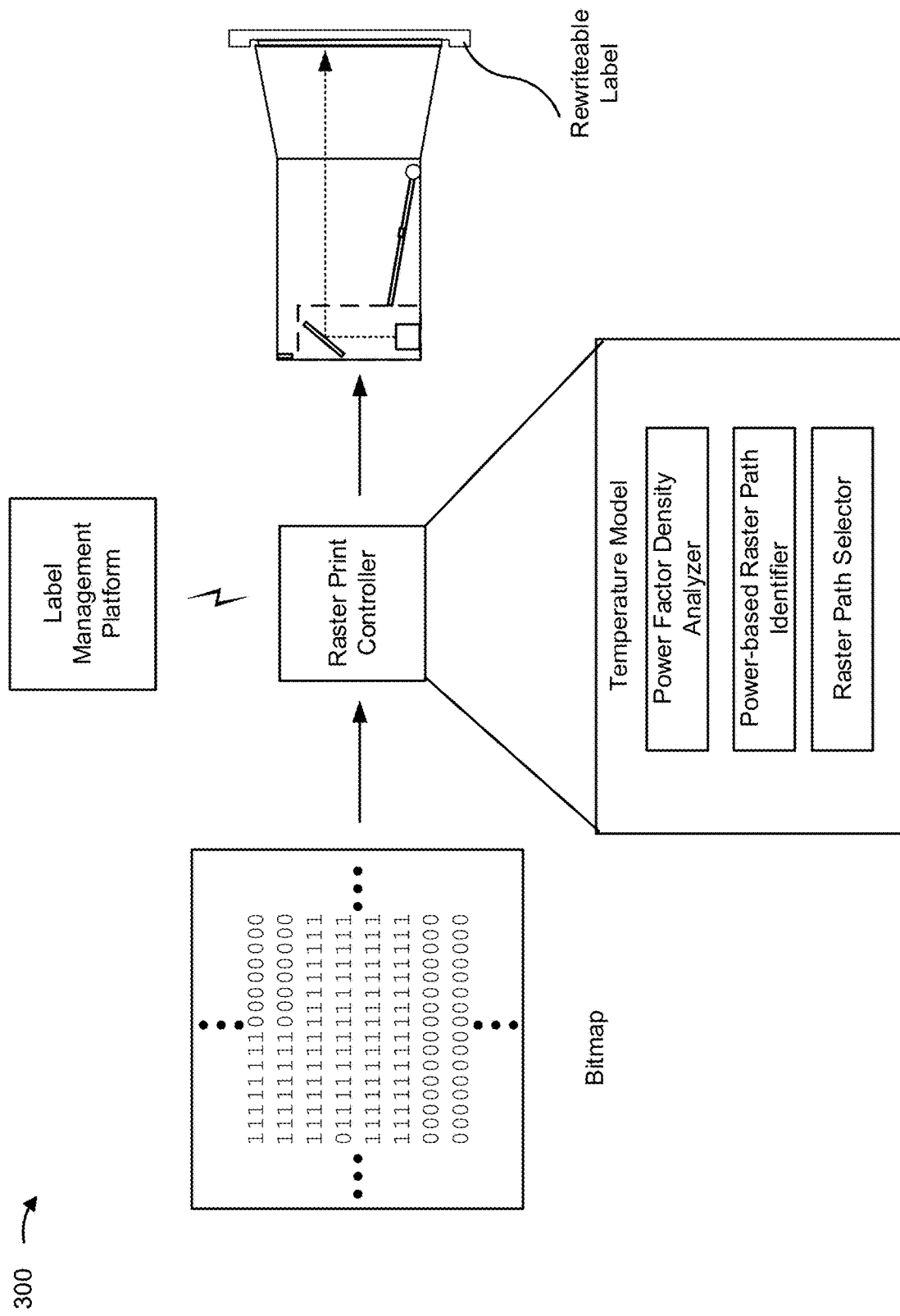
FIG. 3 is a diagram of an example implementation associated with determining a print path for label modification, as described herein.

FIG. 3 is a diagram of an example implementation 300 associated with determining a print path for label modification, as described herein. Example implementation 100 includes a label management platform (e.g., described in connection with FIGS. 1A-1C), a label modification unit that include a raster print controller and a laser printhead (e.g., described in connection with FIGS. 1A-1C), and a rewriteable label (e.g., described in connection with FIGS. 1A-1C). As shown in FIG. 3, the raster print controller may determine a raster print path for a laser printhead to raster print the content (e.g., an image) on the rewriteable label, based on a bitmap (e.g., described in connection with FIGS. 1A and 1B) and a temperature profile (of the raster print path) generated using a temperature model. The raster print path may correspond to an optimal laser print path for printing the content on the rewriteable label. For example, the optimal laser print path may be a print path that causes the least amount of heat dissipation out of a plurality of paths for printing the content on the rewriteable label.

The raster print controller may generate the temperature profile using the temperature model. The temperature model may include a model implemented using one or more memories and/or processors associated with the raster print controller. The temperature model may include a power factor density analyzer, a power-based raster path identifier, and a raster path selector. The factor density analyzer may be used to analyze the array of factors to identify levels of heat for different locations on the rewriteable label. The power-based raster path identifier may be used to determine temperature profiles associated with different print paths. The raster path selector may be used to select a print path (e.g., an optimal print path). The raster print controller may use the temperature model to determine a temperature profile that may be used to select an optimal laser print (described above).

For example, the raster print controller may analyze, using the power factor density analyzer, the bitmap to identify a plurality of raster print paths for raster printing the content on the rewriteable label. For each raster print path, the raster print control may determine a temperature profile. As explained above, the temperature profile may correspond to an expected temperature of a pixel location of the rewriteable label when the laser printhead reaches that pixel location along the raster print path. The raster print controller may identify pixel locations (along the raster print path) of the rewriteable label that are to receive a threshold level of heat to write content to or erase content from the pixel locations to depict the image. Each pixel location may correspond to a pixel location of the image (e.g., a location of a pixel on the image). The threshold level of heat for the pixel locations along the raster print path may be used to determine the temperature profile. In some examples, the raster print controller may analyze the temperature profile in accordance with the bit value of each bit of the bitmap. As explained above, each bit value may correspond to a power level of the light beam emitted by the laser printhead. Accordingly, the raster print controller may determine, based on the temperature profile, an array of power factors (e.g., described in connection with FIGS. 1B and 1C) that are associated with controlling the laser printhead to print the content.

In this regard, for each bit of the array of power factors, the raster print controller may determine an amount of heat (corresponding to the bit value) that the light beam is to provide to the rewriteable label at a corresponding location (e.g., pixel location) of the raster print path and, therefore, may determine the threshold level of heat for that location (e.g., pixel location). In this regard, the raster print controller may identify write pixel locations or pixel locations of the rewriteable label that are to receive a threshold amount of heat (or write threshold amount of heat) to write pixels to the pixel locations. Additionally, the raster print controller may identify erase pixel locations or pixel locations of the rewriteable label that are to receive a threshold amount of heat (or an erase threshold amount of heat) to erase pixels from the pixel locations.

The raster print controller may determine, using the power-based raster path identifier and based on the pixel locations, a plurality of temperature profiles associated with a plurality of raster print paths for writing the content to the rewriteable label. For example, the raster print controller may determine a temperature profile for raster printing the write pixel locations associated with a first power level of the light beam emitted by the laser printhead, a temperature profile for raster printing the write pixel locations associated with a second power level of the light beam, and so on. Additionally, or alternatively, the raster print controller may determine a temperature profile for raster printing a first density (or concentration) of write pixel locations associated with a particular power level of the light beam emitted by the laser printhead, a temperature profile for raster printing a second density (or concentration) of write pixel locations associated with the particular power level of the light beam emitted by the laser printhead, and so on. Additionally, or alternatively, the raster print controller may determine a temperature profile based on a distance between a pair of write pixel locations, a temperature profile based on a pair of erase pixel locations, and/or a temperature profile based on a write pixel location and an erase pixel location.

The determination of temperature profiles discussed above are provided merely as examples. Other examples may differ from what is described with regard to the determination of temperature profiles above. The temperature profile may be based on a temperature (or an amount of heat generated by the light beam at the power level) associated with writing the pixel on the rewriteable label and a rate at which the rewriteable label is cooled at the corresponding pixel location.

According to some implementations, an optimal raster path can be determined for raster printing an image. For example, the controller may analyze a bitmap, determine a plurality of raster paths based on the bitmap (e.g., via a plurality of iterative analyses of the bitmap), select an optimal raster path from the determined plurality of raster paths, and control the laser printhead to modify pixel locations of the label in a sequence that corresponds to the raster path. In other words, a raster print path can be determined, as described herein, that is not preconfigured or fixed to go in a particular pixel-by-pixel or line-by-line order, as described above.

In some implementations, the controller, when using an optimal raster print path to raster print an image can control the light beam to move to a subset of the total pixel locations of the rewriteable label (e.g., unless all of the pixel locations of the rewriteable label are to be modified for a particular image). For example, if a particular pixel (or a particular cluster of pixels) is not to be written or erased from the rewriteable label, the controller may determine and/or select an optimal raster print path that does not include pixel locations corresponding to the pixels. In this way, rather than directing the laser printhead to raster over all pixel locations when raster printing an image, the controller can reduce a time (and correspondingly increase a speed) associated with modifying the rewriteable label.

The raster print controller may select, using the raster path selector of the temperature model, the raster print path, from a plurality of raster print paths associated with the plurality of temperature profiles, that causes a least amount of heat dissipation in the rewriteable label when writing the content (out of the amounts of heat dissipation that may be caused by the plurality of raster print paths). For example, the selected raster print path may correspond to a shortest raster print path through the pixel locations to write the content out of the plurality of raster paths identified by the raster print controller. The selected raster print path may correspond to a raster print path associated with a least amount of adjustment to the power level of the light beam and/or to the focus/spot size of the light beam.

The raster path may be selected and configured to optimize a performance characteristic of the laser printhead. As an example, the performance characteristic may include a shortest raster path between the pixel locations, a fastest time for writing the content, a minimum temperature variation for writing the content, and/or a quality associated with writing the content.

Figure 4A:
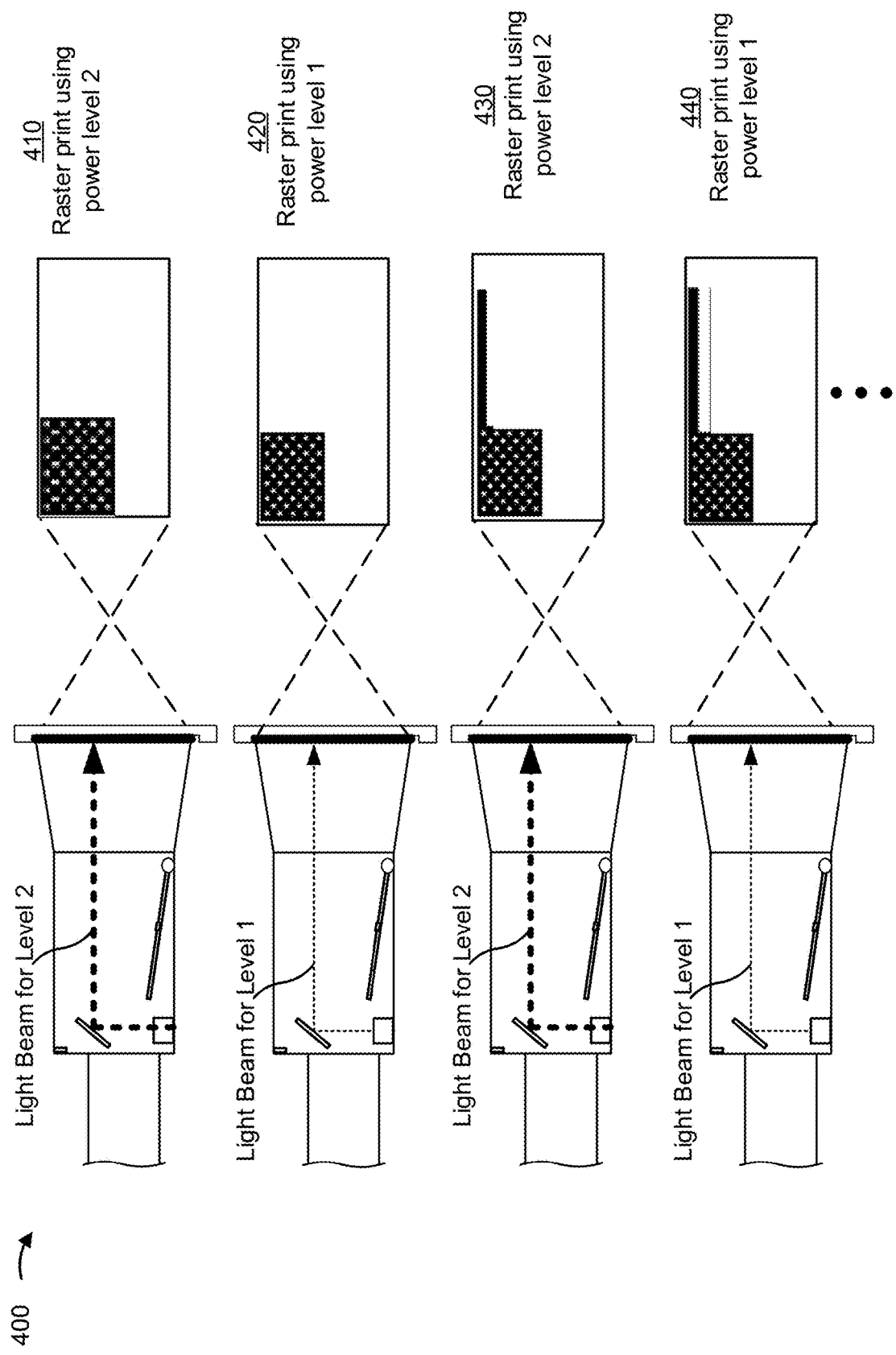
FIGS. 4A and 4B are diagrams of an example implementation associated with controlling a light beam for label modification, as described herein.
Figure 4B:
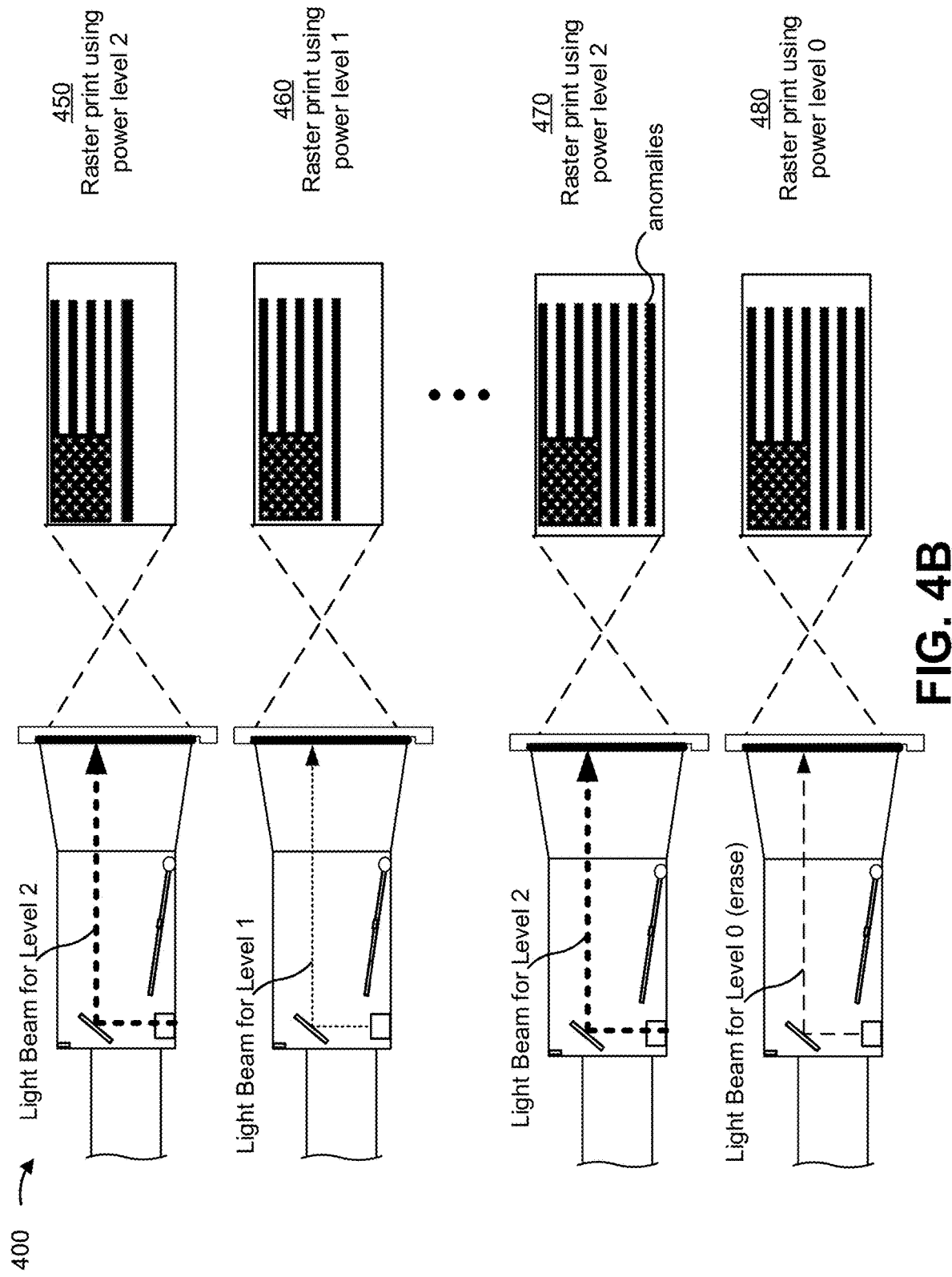

The number and arrangement of devices and components shown in FIG. 3 are provided as one or more examples. In practice, there may be additional devices and/or components, fewer devices and/or components, different devices and/or components, or differently arranged devices and/or components than those shown in FIG. 3. Furthermore, two or more devices or components shown in FIG. 3 may be implemented within a single device or component, or a single device or component shown in FIG. 3 may be implemented as multiple, distributed devices or components. Additionally, or alternatively, a set of devices or components shown in FIG. 3 may perform one or more functions described as being performed by another set of devices or components shown in FIG. 3. FIGS. 4A and 4B are diagrams of an example implementation 400 associated with controlling a light beam for label modification, as described herein. Example implementation 400 illustrates a raster print controller (e.g., described in connection with FIGS. 1A-1C) adjusting a light beam of a laser printhead (and/or a laser) for a label modification of a rewriteable label (e.g., described in connection with FIGS. 1A-1C). The label modification may include a write operation and an erase operation. More specifically, as described below, the raster print controller may control the laser printhead to modify the rewriteable label to display an image. The label modification unit (e.g., the raster print controller and the laser printhead) may perform the label modification of example implementation 400 based on receiving and processing a label modification input (e.g., described in connection with FIGS. 1A-1C), selecting a raster print path that reduces (or prevents) heat dissipation, and printing the content (e.g., the image) on the rewriteable label (e.g., described in connection with FIG. 3).

In this regard, with respect to FIGS. 4A and 4B, assume that the raster print controller has selected a raster print path with a lowest heat dissipation profile of heat dissipation profiles associated with a plurality of raster print paths for printing the image. The raster print path may correspond to a raster print path associated with the least amount of adjustments to the laser printhead out of the amount of adjustments associated the plurality raster print paths.

As shown in FIG. 4A, and by reference number 410, the raster print controller may cause the laser printhead to raster print content using a power level of two (2) of the laser printhead. For example, the raster print controller may cause the laser printhead to raster print the background surrounding the stars depicted in the image.

As shown in FIG. 4A, and by reference number 420, the raster print controller may cause the laser printhead to raster print content using a power level of one (1) of the laser printhead. For example, the raster print controller may cause the laser printhead to raster print an outline of the stars depicted in the image. In this regard, the raster print controller may cause the laser printhead to adjust the power level to a power level of one (1) and to reduce to the spot size for the outline.

As shown in FIG. 4A, and by reference number 430, the raster print controller may cause the laser printhead to raster print content using a power level of two (2) of the laser printhead. For example, the raster print controller may cause the laser printhead to raster print a short stripe of the image. In this regard, the raster print controller may cause the laser printhead to adjust the power level to a power level of two (2) and increase the spot size for printing the stripe.

As shown in FIG. 4A, and by reference number 440, the raster print controller may cause the laser printhead to raster print content using a power level of one (1) of the laser printhead. For example, the raster print controller may cause the laser printhead to raster print an outline of the short stripe depicted in the image. In this regard, the raster print controller may cause the laser printhead to adjust the power level to a power level of one (1).

As shown in FIG. 4B, the process described in connection with reference numbers 430 and 440 may be repeated until all the short stripes are printed. As shown in FIG. 4A, and by reference number 450, the raster print controller may cause the laser printhead to raster print a long stripe depicted in the image, in a manner similar to the manner described in connection with reference number 430. As shown in FIG. 4A, and by reference number 460, the raster print controller may cause the laser printhead to raster print an outline of the long stripe, in a manner similar to the manner described in connection with reference number 440.

As shown in FIG. 4B, the process described in connection with reference numbers 450 and 460 may be repeated until all the long stripes are printed. In regard, as shown in FIG. 4B, and by reference number 470, the raster print controller may cause the laser printhead to raster print the last long stripe depicted in the image, in a manner similar to the manner described in connection with reference number 430. In this case, a resolution of the last long stripes may be degraded (e.g., there may be some anomalies associated with the last long stripe). For example, the anomalies may be caused by heat dissipation.

As shown in FIG. 4B, and by reference number 480, the raster print controller may cause the laser printhead to erase content using a power level of zero (0) of the laser printhead. For example, the raster print controller may cause the laser printhead to raster print to remove any content that may appear on the rewriteable label due to heat dissipation. For instance, to erase the content, the raster print controller may cause the laser printhead to adjust the power level to a power level of zero (0) and adjust the spot size. Additionally, or alternatively, the raster print controller may control dwell time and/or a movement rate of the light beam of the laser printhead to erase the content (e.g., the anomalies).

The raster print sequence discussed above is provided merely as an example. Other examples may differ from what is described with regard to the raster print sequence above. For example, the raster print controller may control the laser printhead to raster print all content with a power level of two (2), then raster print all content with a power level of one (1), and then raster print all content with a power level of zero (0).

The number and arrangement of devices and components shown in FIGS. 4A and 4B are provided as one or more examples. In practice, there may be additional devices and/or components, fewer devices and/or components, different devices and/or components, or differently arranged devices and/or components than those shown in FIGS. 4A and 4B. Furthermore, two or more devices or components shown in FIGS. 4A and 4B may be implemented within a single device or component, or a single device or component shown in FIGS. 4A and 4B may be implemented as multiple, distributed devices or components. Additionally, or alternatively, a set of devices or components shown in FIGS. 4A and 4B may perform one or more functions described as being performed by another set of devices or components shown in FIGS. 4A and 4B.

Figure 5:
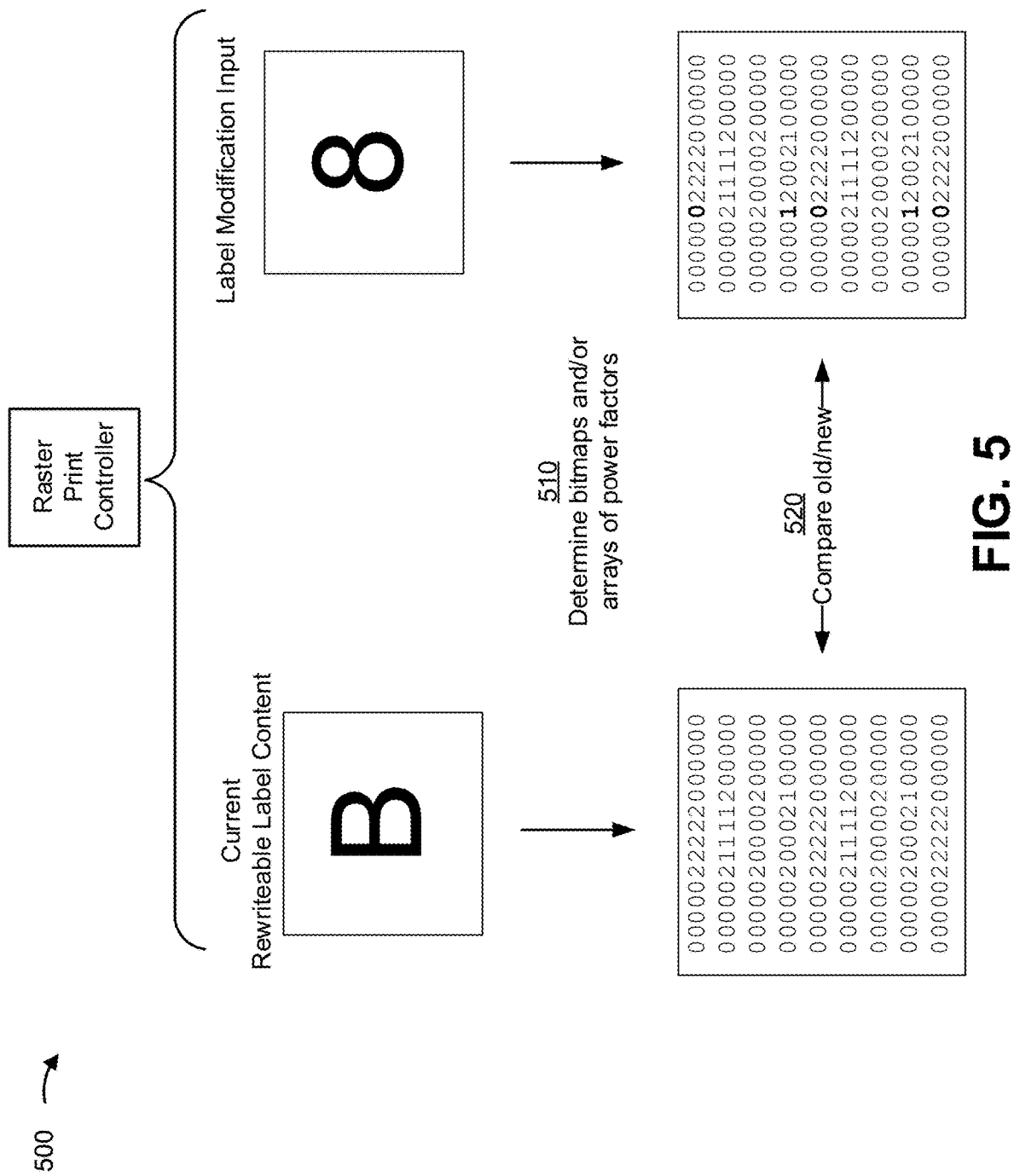
FIG. 5 is a diagram of an example implementation associated with label modification, as described herein.

FIG. 5 is a diagram of an example implementation 500 associated with label modification of a rewriteable label, as described herein. Example implementation 500 illustrates the process of a raster print controller (e.g., described in connection with FIGS. 1A-1C) causing a label modification of a rewriteable label (e.g., described in connection with FIGS. 1A-1C) based on a label modification input. The label modification may include a write operation and an erase operation. As explained above, the label modification input may be obtained from a label management platform, a user device, a memory of the raster print controller, and/or the like.

As shown in FIG. 5, the current content of the rewriteable label is the letter "B." As shown in FIG. 5, the content of the label modification input is the number "8." In this regard, the raster print controller is to modify the content of the rewriteable label from the letter "B" to the number "8" based on the label modification input. Accordingly, as shown in FIG. 5 and by reference number 510, the raster print control may determine bitmaps and/or arrays of power factors based on the content of the rewriteable label and the content of the label modification input. For example, the raster print controller may obtain the content of the rewriteable label from the label management platform, a user device, a memory of the raster print controller, and/or the like. The raster print controller may convert the content of the rewritable label into a bitmap and generate an array of power factors based on the bitmap in a manner similar to the manner described above in connection with FIGS. 1A-1C. Alternatively, the raster print controller may obtain the array of power factors from the label management platform, a memory of the raster print controller, and/or the like.

The raster print controller may convert the content of the label modification input into a bitmap and generate an array of power factors based on the bitmap in a manner similar to the manner described above in connection with FIGS. 1A-1C. The bitmap of the content of the label modification input may be different than the bitmap of the content of the rewriteable label. Similarly, the array of power factors of for the label modification input may be different than the array of power factors for the rewriteable label.

As shown in FIG. 5, and by reference number 520, the raster print controller may compare the array of power factors for the label modification and the array of power factors for the rewriteable label. Based on a result of the comparison, the raster print controller may identify differences in the array of power factors for the label modification input with respect to the array of power factors for the rewriteable label. As shown in FIG. 5, the raster print controller may identify, based on a result of the comparison, the content elements (e.g., pixels) that need to be written to and/or erased from the rewriteable label to modify the content of the rewriteable label. As shown in FIG. 5, the raster print controller may also determine the corresponding power levels (of the light beam) to cause the content elements to be written to and erased from the rewriteable label with the least amount of heat dissipation. The raster print controller may then select a raster print path for raster printing the content elements in manner similar to the manner described above with respect to FIG. 3.

As indicated above, FIG. 5 is provided merely as an example. Other examples may differ from what is described with regard to FIG. 5.

Figure 6:
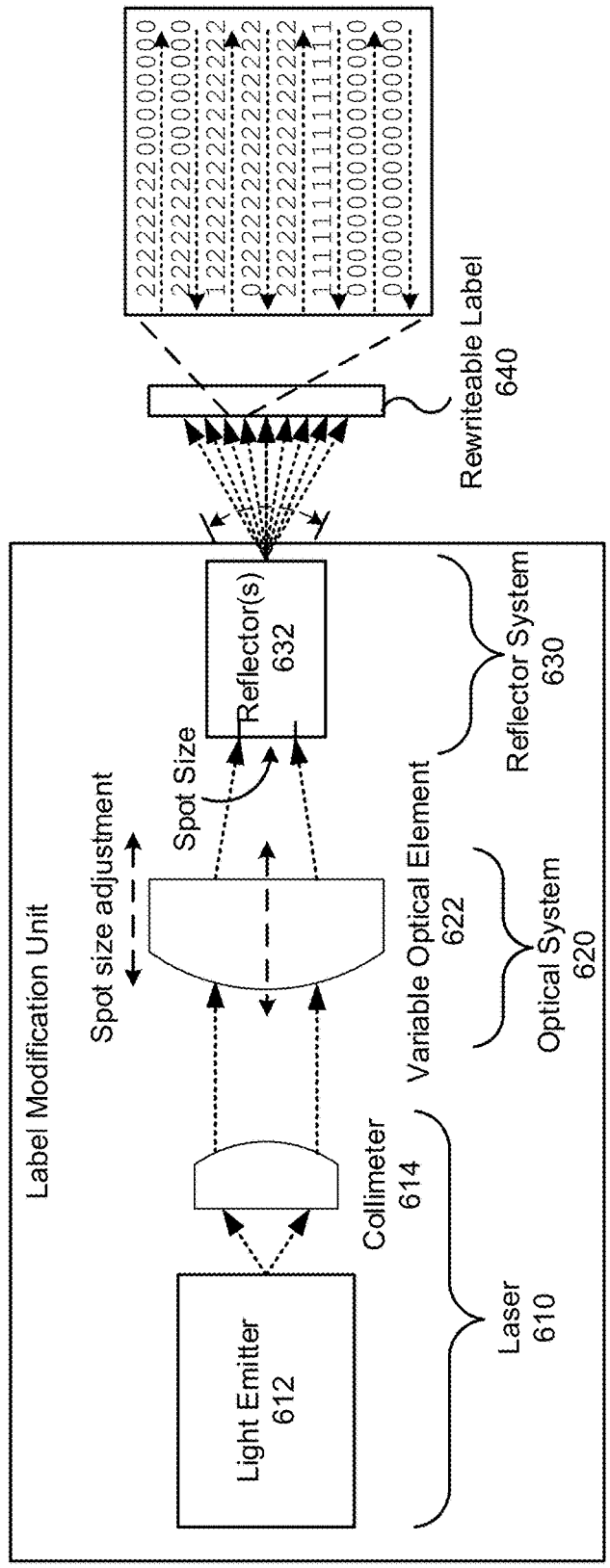
FIG. 6 is a diagram of an example implementation of a laser modification unit described herein.

FIG. 6 is a diagram of an example implementation of a label modification unit 600 described herein. The label modification unit 600 may be the label modification unit of the example implementations described herein. As shown in FIG. 6, the label modification unit includes a laser 610 that includes has a light emitter 612 and a collimator 614, an optical system 620 that includes a variable optical element 622, and a reflector system 630 that includes one or more reflectors 632. FIG. 6 further illustrates an optical path of a light beam formed from light being emitted by the laser 610, adjusted or focused by the optical system 620, and directed by the reflector system 630 to modify a rewriteable label 640 (e.g., corresponding to the rewriteable label of example implementations described herein).

The light emitter 612 may generate light that can be focused by the collimator 614 into a light beam that has a particular power (e.g., that may be based on supplied power and/or an optical configuration of the collimator 614). The collimator 614 may include a fixed lens (e.g., an F-theta lens) to focus the light beam according to one or more desired attributes (e.g., so that a consistent light beam is provided to the optical system 620). Accordingly, the laser 610 may output a light beam to the optical system 620, which may uses the variable optical element 622 to focus the light beam to have a particular spot size. As shown, the variable optical element 622 may perform a spot size adjustment based on movement of the variable optical element 622 relative to the laser 610 and/or adjusting a shape and/or configuration of the variable optical element 622. Accordingly, the variable optical element 622 can include any suitable reconfigurable optical element that can adjust a focus of the light beam (e.g., rotatable lenses, liquid lenses, and/or the like).

The reflector system 630 may include one or more reflectors 632 (referred to collectively as "reflectors 632" and individually as "reflector 632") to redirect the light beam emitted by the laser. The reflector 632 may include an actuatable and/or adjustable mirror, a reflective material, and/or the like that may be used to reflect and/or direct the light beam toward a particular direction. The reflectors 632 may be controlled to move as a function of time or another variable.

As shown in FIG. 6, light is emitted, during a write operation or erase operation, from the light emitter 612 and focused into a light beam by the collimator 614. The light beam is to pass through the variable optical element 622, which may adjust (e.g., according to a position or shape) to vary a spot size, focus, and/or power density of the light beam. The light beam is to further pass through one or more reflectors 632 to be directed onto a particular area or position of the rewriteable label 640 to modify content of the rewriteable label. In this way, the laser 610 can be controlled to sweep light beams with various attributes over areas of the rewriteable label 640 to correspondingly write content or erase content.

As indicated above, FIG. 6 is provided merely as an example. Other examples may differ from what is described with regard to FIG. 6.

Figure 7:
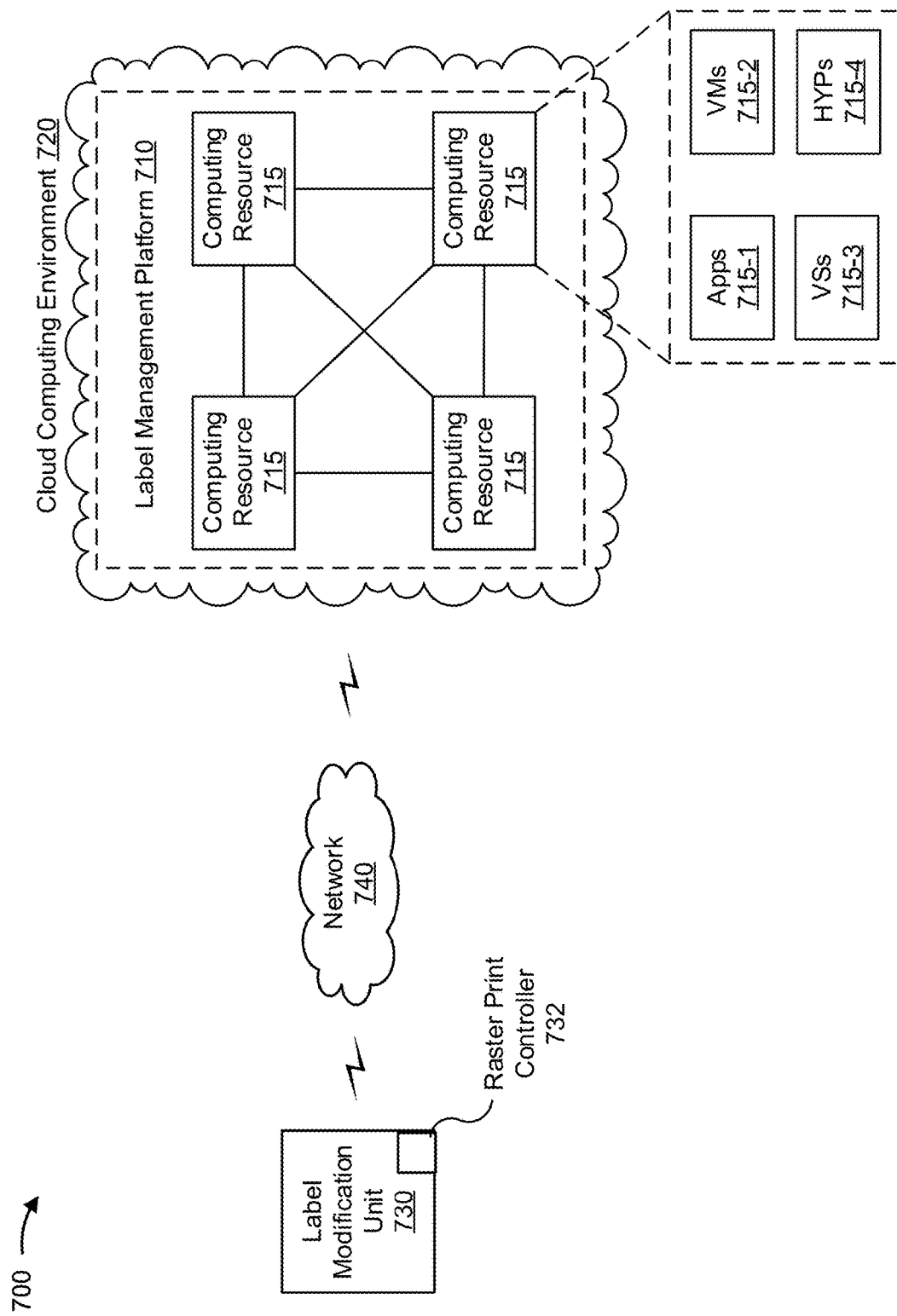
FIG. 7 is a diagram of an example environment in which systems and/or methods described herein may be implemented.

FIG. 7 is a diagram of an example environment 700 in which systems and/or methods, described herein, may be implemented. As shown in FIG. 7, environment 700 may include a label management platform 710 (e.g., the label management platform of example implementation 100) that is hosted by computing resources 715 of a cloud computing environment 720, a label modification system 730 (e.g., the label modification system of example implementation 100) with a raster print controller 732 (e.g., corresponding to the raster print controller of example implementation 100), and a network 740. Devices of the environment 700 may interconnect via wired connections, wireless connections, or a combination of wired and wireless connections.

The label management platform 710 includes one or more devices that manage information associated with labelling one or more rewriteable labels of an environment, as described herein. In some implementations, the label management platform 710 may be designed to be modular such that certain software components may be swapped in or out depending on a particular need. As such, the label management platform 710 may be easily and/or quickly reconfigured for different uses. The label management platform 710 may receive information from and/or transmit information to label modification unit 730 (and/or the raster print controller 732), as described herein.

In some implementations, as shown, the label management platform 710 may be hosted in the cloud computing environment 720. Notably, while implementations described herein describe the label management platform 710 as being hosted in the cloud computing environment 720, in some implementations, the label management platform 710 may not be cloud-based (i.e., may be implemented outside of a cloud computing environment) or may be partially cloud-based.

The cloud computing environment 720 includes an environment that hosts the label management platform 710. The cloud computing environment 720 may provide computation, software, data access, storage, etc., services that do not require end-user knowledge of a physical location and configuration of system(s) and/or device(s) that hosts the label management platform 710. As shown, the cloud computing environment 720 may include a group of the computing resources 715 (referred to collectively as "computing resources 715" and individually as "computing resource 715").

The computing resource 715 includes one or more personal computers, workstation computers, mainframe devices, or other types of computation and/or communication devices. In some implementations, the computing resource 715 may host the label management platform 710. The cloud resources may include compute instances executing in the computing resource 715, storage devices provided in the computing resource 715, data transfer devices provided by the computing resource 715, etc. In some implementations, a computing resource 715 may communicate with other computing resources 715 via wired connections, wireless connections, or a combination of wired and wireless connections.

As further shown in FIG. 7, one or more of the computing resources 715 may include a group of cloud resources, such as one or more applications ("APPs") 715-1, one or more virtual machines ("VMs") 715-2, virtualized storage ("VSs") 715-3, one or more hypervisors ("HYPs") 715-4, and/or the like.

The application 715-1 includes one or more software applications that may be provided to or accessed by the label management platform 710. The application 715-1 may eliminate a need to install and execute the software applications on the label management platform 710. For example, application 715-1 may include software associated with the label management platform 710 and/or any other software capable of being provided via the cloud computing environment 720. In some implementations, one application 715-1 may send/receive information to/from one or more other applications 715-1 via virtual machine 715-2.

The virtual machine 715-2 includes a software implementation of a machine (e.g., a computer) that executes programs like a physical machine. The virtual machine 715-2 may be either a system virtual machine or a process virtual machine, depending upon use and degree of correspondence to any real machine by the virtual machine 715-2. A system virtual machine may provide a complete system platform that supports execution of a complete operating system ("OS"). A process virtual machine may execute a single program and may support a single process. In some implementations, the virtual machine 715-2 may execute on behalf of a user (e.g., an operator of the label management platform 710), and may manage infrastructure of the cloud computing environment 720, such as data management, synchronization, or long-duration data transfers.

The virtualized storage 715-3 includes one or more storage systems and/or one or more devices that use virtualization techniques within the storage systems or devices of the computing resource 715. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 715-4 may provide hardware virtualization techniques that allow multiple operating systems (e.g., "guest operating systems") to execute concurrently on a host computer, such as computing resource 715. The hypervisor 715-4 may present a virtual operating platform to the guest operating systems and may manage the execution of the guest operating systems. Multiple instances of a variety of operating systems may share virtualized hardware resources.

The label modification unit 730 includes the raster print controller 732 and a laser printhead (e.g., a single laser printhead) that can be controlled by the raster print controller 732 to modify (e.g., autonomously or semi-autonomously based on a label modification input) one or more rewriteable labels. The raster print controller 732 may include one or more devices (e.g., one or more processors, one or more memories, and/or the like) that are capable of controlling one or more components of the label modification unit 730, as described herein.

The network 740 includes one or more wired and/or wireless networks. For example, the network 740 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 7 are provided as one or more examples. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
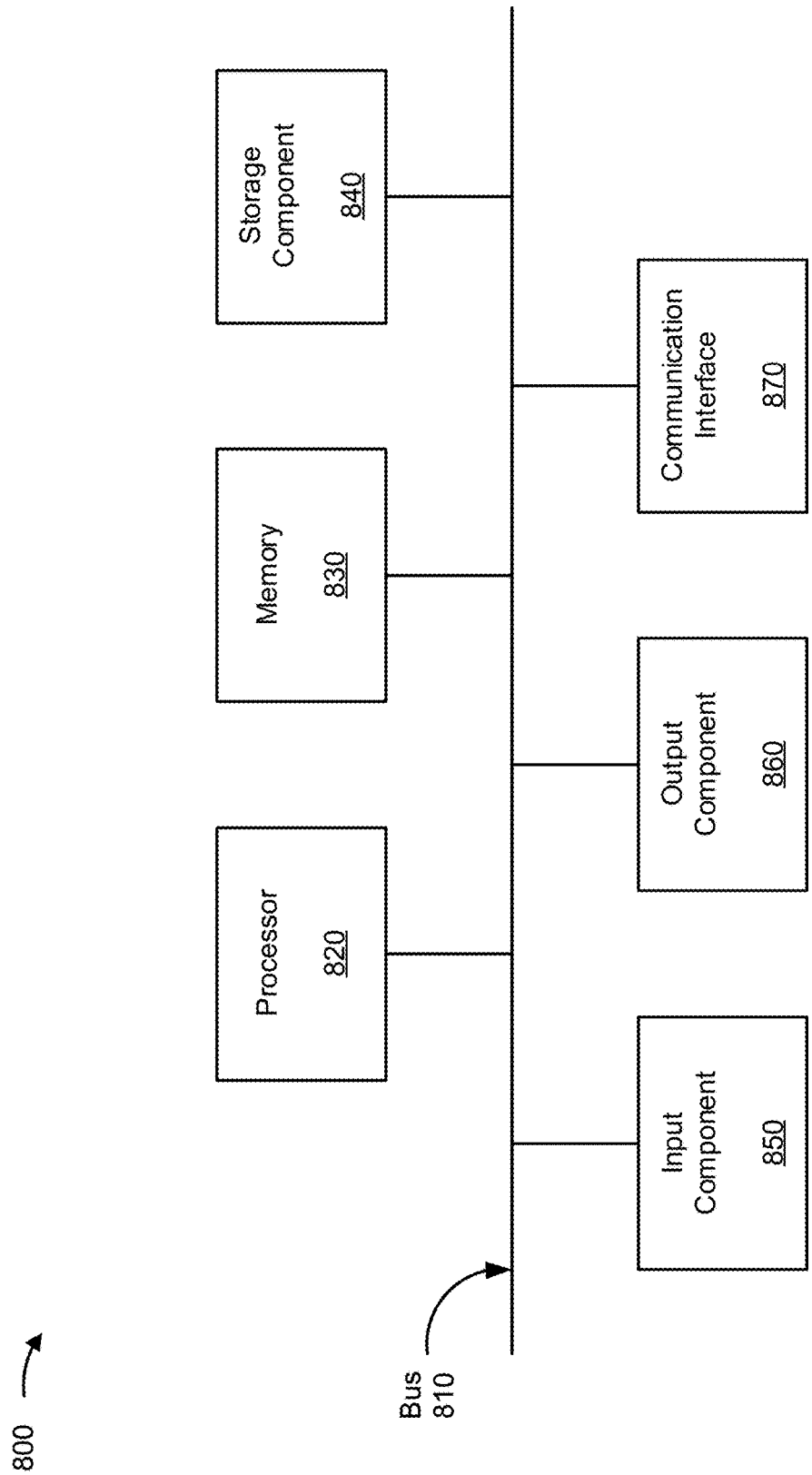
FIG. 8 is a diagram of example components of one or more devices of FIG. 7.

FIG. 8 is a diagram of example components of a device 800. Device 800 may correspond to the label management platform 710, the label modification unit 730, the raster print controller 732, and/or the like. In some implementations, the label management platform 710, the label modification unit 730, and/or the raster print controller 732 may include one or more devices 800 and/or one or more components of device 800. As shown in FIG. 8, device 800 may include a bus 810, a processor 820, a memory 830, a storage component 840, an input component 850, an output component 860, and a communication interface 870.

Bus 810 includes a component that permits communication among multiple components of device 800. Processor 820 is implemented in hardware, firmware, and/or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 850 includes a component that permits device 800 to receive information, such as via user input (e.g., a touch screen display, a keyboard, a keypad, a mouse, a button, a switch, and/or a microphone). Additionally, or alternatively, input component 850 may include a component for determining location (e.g., a global positioning system (GPS) component) and/or a sensor (e.g., an accelerometer, a gyroscope, an actuator, another type of positional or environmental sensor, and/or the like) to navigate and/or control the label modification unit 730. Output component 860 includes a component that provides output information from device 800 (via, e.g., a display, a speaker, a haptic feedback component, an audio or visual indicator, and/or the like). Additionally, or alternatively, output component 860 may include and/or be associated with components of the label modification unit and/or one or more control devices (e.g., electromechanical devices) configured to control components of the label modification unit and/or components of the placement device of example implementation 100.

Communication interface 870 includes a transceiver-like component (e.g., a transceiver, a separate receiver, a separate transmitter, and/or the like) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a wireless local area network interface, a cellular network interface, and/or the like.

Device 800 may perform one or more processes described herein. Device 800 may perform these processes based on processor 820 executing software instructions stored by a non-transitory computer-readable medium, such as memory 830 and/or storage component 840. As used herein, the term "computer-readable medium" refers to a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

Figure 9:
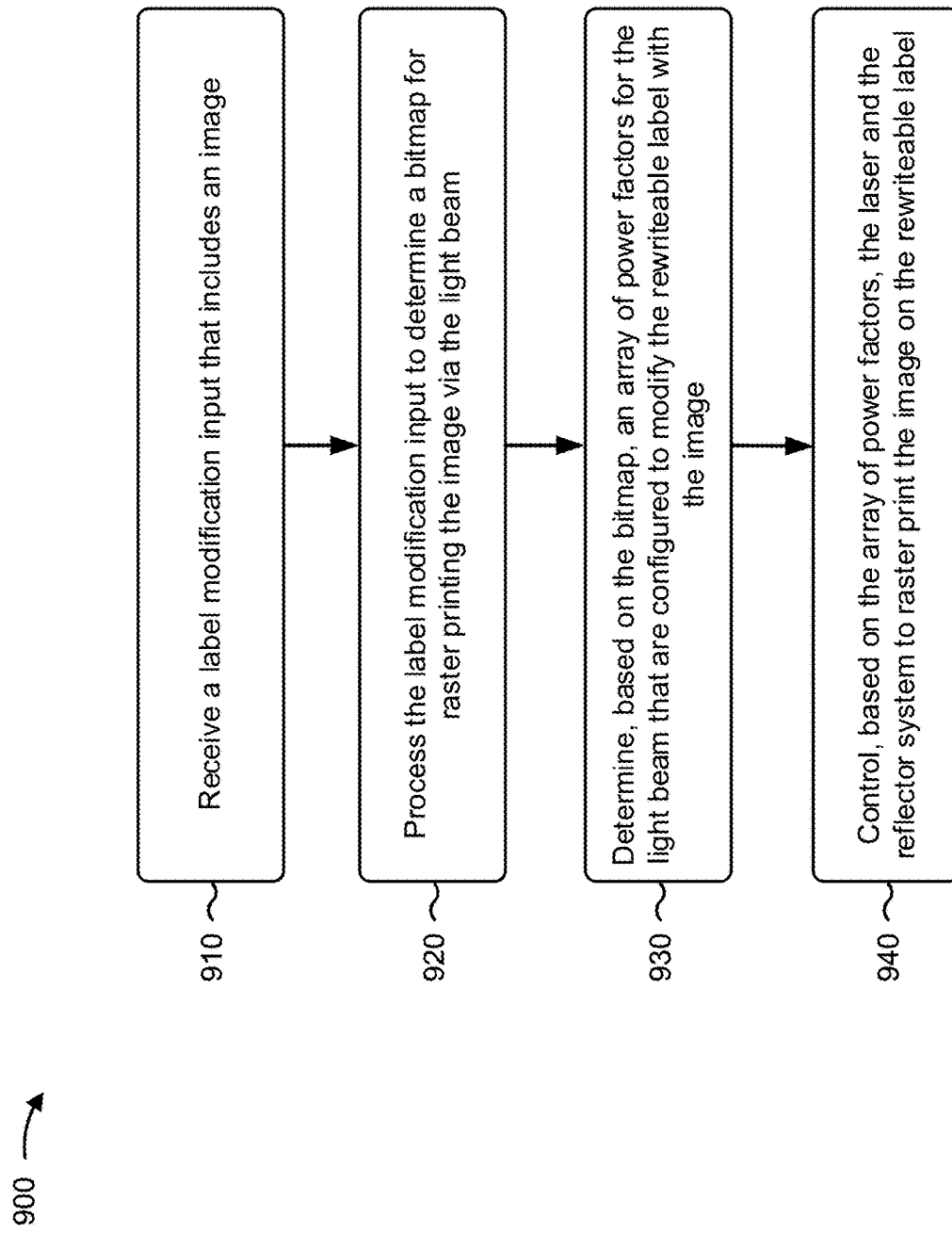
FIG. 9 is a flowchart of an example process for control of a laser printhead for erasing and writing content.

FIG. 9 is a flowchart of an example process 900 for control of laser printhead for writing or erasing content. In some implementations, one or more process blocks of FIG. 9 may be performed by a label modification unit (e.g., label modification unit 600, label modification unit 730, and/or the like). In some implementations, one or more process blocks of FIG. 9 may be performed by another device or a group of devices separate from or including the device, such as a label management platform (e.g., label management platform 710) and/or the like.

As shown in FIG. 9, process 900 may include receiving a label modification input that includes an image (block 910). For example, the label modification unit (e.g., using the raster print controller 732, the processor 820, the memory 830, the storage component 840, the input component 850, the output component 860, the communication interface 870, and/or the like) may receive a label modification input that includes an image that is to be written to or erased from a label, as described above. For example, the label may be a rewriteable label. The label modification input may be received as a stream of input. The image may be depicted by one or more pixels.

As further shown in FIG. 9, process 900 may include processing the label modification input to determine a bitmap for raster printing the image via the light beam (block 920). For example, the label modification unit (e.g., using the raster print controller 732, the processor 820, the memory 830, the storage component 840, the input component 850, the output component 860, the communication interface 870, and/or the like) may process the label modification input, using binary image filtering, to determine a bitmap for raster printing the image. The label modification input may be processed to determine the bitmap, as discussed above. The bitmap may be a binary bitmap that includes a bit (e.g., 1) indicating a content item (e.g., a pixel) to written to the label and another bit (e.g., 0) indicating a content element (e.g., a pixel) to be erased from the label.

As further shown in FIG. 9, process 900 may include determining, based on the bitmap, an array of power levels for the light beam to modify the rewriteable label to include the image (block 930). For example, the label modification unit (e.g., using the raster print controller 732, the processor 820, the memory 830, the storage component 840, the input component 850, the output component 860, the communication interface 870, and/or the like) may determine, based on the bit map, an array of power factors for the light beam to modify the rewriteable label, as described above. As explained above, the power factors may include information identifying (e.g., non-binary bits) identifying different power levels for the light beam to modify the rewriteable label. Accordingly, the array of power factors may be a non-binary bitmap corresponding to the bitmap.

The label modification unit may determine a power level (for the light beam) for each bit of the bitmap based on the value of the bit, as explained above. When determining the power lever, the label modification unit may account for heat dissipation. For example, the label modification unit may compare a first bit of the bitmap to a second bit of the bitmap that is adjacent to the first bit and assign a power level based on whether the first bit and the second bit are a same value. For example, the first bit and the second bit may adjacent if they are on the same column of the bitmap but on different rows of the bitmap (the second bit on a row immediately below a row of the first bit). In this regard, if a value of the first bit and the second bit is one (1), then the label modification unit may assign a power level of two (2) or higher, as explained above. Alternatively, if a value of the first bit and the second bit is zero (0), then the label modification unit may assign a power level of zero (0), as explained above. Alternatively, if a value of the first bit is one (1) and the value of the second bit is zero (0), then the label modification unit may assign a power level one (1) to the first bit and a power level of zero (0) to the second bit to prevent or reduce heat dissipation that would have otherwise occurred if the first bit was assigned a power level of two (2) or higher for writing content. Conversely, if a value of the first bit is zero (0) and the value of the second bit is one (1), then the label modification unit may assign a power level zero (0) to the first bit and a power level of one (1) to the second bit to prevent or reduce heat dissipation that would have otherwise occurred if the second bit was assigned a power level of two (2) or higher.

Alternatively, the label modification unit may determine, based on the first bit, a first desired temperature profile of the rewriteable label to depict a first pixel of the image on the rewriteable label and determine, based on the second bit, a second desired temperature profile of the rewriteable label to depict a second pixel of the image on the rewriteable label. The label modification unit may assign a power level based on a difference between the first desired temperature profile and the second desired temperature. For example, if the first desired temperature profile is associated with writing content (relatively high temperature and corresponding slow cooling rate) and the second desired temperature profile is associated with erasing content (relatively low temperature and corresponding fast cooling rate), then the label modification unit may assign a power level one (1) to the first bit and a power level of zero (0) to the second bit to prevent or reduce heat dissipation that would have otherwise occurred if the first bit was assigned a power level of two (2) or higher for writing content. Conversely, if the first desired temperature profile is associated with erasing content and the second desired temperature profile is associated with writing content, then the label modification unit may assign a power level zero (0) to the first bit and a power level of one (1) to the second bit to prevent or reduce heat dissipation that would have otherwise occurred if the second bit was assigned a power level of two (2) or higher.

Alternatively, the label modification unit may determine a quantity of bits between the first bit and the second bit along a raster print path of the laser printhead and assign based on the quantity of bits. For example, the quantity of bits may be indicative heat dissipation. For instance, the quantity of bits may be indicative of a cooling rate between emitting the light beam for the first bit and emitting the light beam for the second bit.

The label modification unit may determine the power levels based on identifying a characteristic associated with the rewriteable label or the laser. The characteristic may include thermal sensitivity of the rewriteable label and/or a range of power levels associated with the laser. For example, the label modification unit may determine a configuration associated with the laser to determine the range of power levels. In this regard, the configuration may indicate capabilities of the laser with respect to power level range and/or cooling capability.

As further shown in FIG. 9, process 900 may include controlling, based on the array of power levels, the laser and the reflector system to raster print the image on the rewriteable label (block 940). For example, the label modification unit (e.g., using the raster print controller 732, the processor 820, the memory 830, the storage component 840, the input component 850, the output component 860, the communication interface 870, and/or the like) may control a configuration of the laser, the optical element, and/or the reflector system to raster print the image, as described above. For instance, the label modification unit may cause the laser to emit the light beam to write pixels or erase pixels of the rewriteable label to depict the image.

When causing the laser to emit the light beam, the label modification unit may select a raster print path, as described above, and may control the light beam to follow, using a reflector system of the laser printhead, a raster print path defined by the array of power factors.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a flowchart of an example process 1000 for control of laser printhead for writing or erasing content. In some implementations, one or more process blocks of FIG. 10 may be performed by a label modification unit (e.g., label modification unit 600, label modification unit 730, and/or the like). In some implementations, one or more process blocks of FIG. 10 may be performed by another device or a group of devices separate from or including the device, such as a label management platform (e.g., label management platform 710) and/or the like.

As shown in FIG. 10, process 1000 may include obtaining a bitmap associated with a modification to the rewriteable label (block 1010). For example, the label modification unit (e.g., using the raster print controller 732, the processor 820, the memory 830, the storage component 840, the input component 850, the output component 860, the communication interface 870, and/or the like) may obtain a bitmap associated with a modification to the rewriteable label, as described above. The bitmap may be generated from a label modification input that includes an image.

As further shown in FIG. 10, process 1000 may include determining, based on the bitmap and using a heat dissipation model, temperature profiles for a plurality of raster print paths of the laser (block 1020). For example, the label modification unit (e.g., using the raster print controller 732, the processor 820, the memory 830, the storage component 840, the input component 850, the output component 860, the communication interface 870, and/or the like) may determine, based on the bitmap and using a heat dissipation model, temperature profiles for a plurality of raster print paths of the laser, as described above. The temperature profiles may indicate expected temperatures during the modification of pixel locations along the raster print path.

To determine the temperature profiles, the label modification unit may determine laser heat dissipation factors associated with emitting the light beam to modify the rewriteable label according to individual power factors of the array of power factors. For example, the heat dissipation factors may be determined based on heat dissipation associated with a power level for a first bit of the bitmap and a power level for a second bit of the bitmap (adjacent to the first bit on the bitmap), as described above. The label modification unit may determine optical heat dissipation factors associated with positioning an optic of the label modification unit to modify the rewriteable label according to individual power factors of the array of power factors. For example, the optic may be configured to control a spot size of the light beam based on a position of the optic relative to the laser. The label modification may determine the optical heat dissipation factors based on specifications of the laser and the optic. The specifications may be obtained from the label management platform (described herein), a user device (described herein), a memory of the label modification unity, and/or the like. The label modification unity may determine the raster print path based on the laser heat dissipation factors and the optical heat dissipation factors.

As further shown in FIG. 10, process 1000 may include selecting, based on the temperature profiles and from the plurality of raster print paths, a raster print path for the modification (block 1030). For example, the label modification unit (e.g., using the raster print controller 732, the processor 820, the memory 830, the storage component 840, the input component 850, the output component 860, the communication interface 870, and/or the like) may select the raster print path for the modification according to a performance characteristic of the modification.

The performance characteristic may be determined based on a setting of the label modification unit and/or a user input to the label modification unit. The performance characteristic may include a shortest raster path between the pixel locations, a fastest time for writing the content, a minimum temperature variation for writing the content, a quality associated with writing the content, and/or the like.

As further shown in FIG. 10, process 1000 may include controlling at least one of the laser, the optic, and the reflector system to: cause the light beam to follow the raster print path, and emit the light beam according to an array of power factors that are associated with the raster print path (block 1040). For example, the label modification unit (e.g., using the raster print controller 732, the processor 820, the memory 830, the storage component 840, the input component 850, the output component 860, the communication interface 870, and/or the like) may control at least one of the laser, the optic, and the reflector system to: cause the light beam to follow the raster print path and emit the light beam according to an array of power factors that are associated with the raster print path. In this regard, the label modification unity may control a position of the optic relative to the laser according to spot sizes of the array of power factors.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method, comprising:
    receiving, by a device, a label modification input associated with an image;
    processing, by the device and using an image filtering, the label modification input to convert the image to a bitmap for raster printing the image via a laser printhead;
    determining, by the device and based on the bitmap, an array of power factors for a light beam that is configured to be emitted by a laser of the laser printhead and raster print the image, wherein determining the array of power factors includes, for a power level of the array of power factors:
        (i) determining, based on a first bit of the bitmap, a first desired temperature profile of a rewriteable label to depict a first pixel of the image;
        (ii) determining, based on a second bit of the bitmap, a second desired temperature profile of the rewriteable label to depict a second pixel of the image; and
        (iii) assigning the power level based on a difference between the first desired temperature profile and the second desired temperature profile; and
    controlling, by the device, the laser of the laser printhead in association with raster printing the image on the rewriteable label according to the array of power factors.

2. The method of claim 1, wherein the first bit and the second bit are adjacent.

3. The method of claim 1, further comprising:
    determining a quantity of bits between the first bit and the second bit along a raster print path of the laser printhead; and
    assigning the power level based on the quantity of bits.

4. The method of claim 1, wherein the array of power factors is a non-binary bitmap that corresponds to the bitmap.

5. The method of claim 1, wherein dimensions of the array of power factors are the same as dimensions of a pixel array of the image when depicted on the label.

6. The method of claim 1, wherein controlling the laser according to the array of power factors comprises:
    causing the laser to emit the light beam to write pixels or erase pixels of the rewriteable label to depict the image.

7. A device, comprising:
    a memory; and
    a processor, communicatively coupled to the memory, configured to:
        receive an image;
        convert the image to a bitmap for raster printing the image via a laser printhead;
        determine, based on the bitmap, an array of power factors for a light beam that is configured to be emitted by a laser of the laser printhead, wherein the processor is configured, to determine the array of power factors, to:
            (i) determine, based on a first bit of the bitmap, a first desired temperature profile of a rewriteable label to depict a first pixel of the image;
            (ii) determine, based on a second bit of the bitmap, a second desired temperature profile of the rewriteable label to depict a second pixel of the image; and
            (iii) assign a power level of the array of power factors based on a difference between the first desired temperature profile and the second desired temperature profile; and
        cause the laser printhead to emit the light beam to raster print the image on the rewriteable label according to the array of power factors.

8. The device of claim 7, wherein the processor, when determining the array of power factors, is configured to:
    determine individual power levels, of the array of power factors, based on a raster print path of the laser printhead.

9. The device of claim 8, wherein the raster print path is based on a row and column configuration of the bitmap.

10. The device of claim 7, wherein the processor, when the determining the array of power factors, is configured to:
    determine individual power levels of the array of power factors for each of a plurality of distinct first bits.

11. The device of claim 7, wherein the bitmap is a binary bitmap and the array of power factors is a non-binary bitmap.

12. The device of claim 7, wherein dimensions of the bitmap and dimensions of the array of power factors are the same as dimensions of a pixel array of the image when depicted on the rewriteable label.

13. The device of claim 7, wherein the processor, when causing the laser printhead to emit the light beam, is configured to:
    control the laser printhead to emit the light beam to write pixels or erase pixels of the rewriteable label to depict the image; and
    control the light beam to follow, using a reflector system of the laser printhead, a raster print path defined by the array of power factors.

14. A label modification unit comprising:
    a laser configured to emit a light beam to modify a rewriteable label;
    a reflector system to direct the light beam along a raster print path; and
    a controller configured to:
        receive a label modification input that includes an image;
        process the label modification input to determine a bitmap for raster printing the image via the light beam;
        determine, based on the bitmap, an array of power factors for the light beam that are configured to modify the rewriteable label with the image, wherein the controller is configured, to determine the array of power factors, to:
            (i) determine, based on a first bit of the bitmap, a first desired temperature profile of the rewriteable label to depict a first pixel of the image;

(ii) determine, based on a second bit of the bitmap, a second desired temperature profile of the rewriteable label to depict a second pixel of the image; and (iii) assign a power level of the array of power factors based on a difference between the first desired temperature profile and the second desired temperature profile; and control, based on the array of power factors, the laser and the reflector system to raster print the image on the rewriteable label.

15. The label modification unit of claim 14, wherein the controller, when processing the label modification input, is configured to:

convert the image to the bitmap according to a raster configuration of the reflector system.

16. The label modification unit of claim 14, wherein the controller, when determining the array of power factors, is configured to:

determine a laser configuration associated with the laser, and determine individual power levels of the array of power factors based on the laser configuration.

17. The label modification unit of claim 14, wherein the array of power factors includes one or more of:

a power level of the laser, a spot size of the light beam, or a dwell time to modify a pixel of the label.

18. The label modification unit of claim 14, further comprising:

an optic that is configured to be in a fixed position during raster printing.

* * * * *